(12) United States Patent
Horio et al.

(10) Patent No.: US 7,986,759 B2
(45) Date of Patent: Jul. 26, 2011

(54) DATA OUTPUT METHOD, DATA OUTPUT APPARATUS AND COMMUNICATION SYSTEM

(75) Inventors: Kenichi Horio, Kawasaki (JP); Takashi Ohno, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 752 days.

(21) Appl. No.: 11/191,299

(22) Filed: Jul. 28, 2005

(65) Prior Publication Data

US 2006/0193416 A1 Aug. 31, 2006

(30) Foreign Application Priority Data

Feb. 25, 2005 (JP) ................. 2005-051993

(51) Int. Cl.
*H04L 7/00* (2006.01)
*H04L 25/00* (2006.01)
*H04L 25/40* (2006.01)
(52) U.S. Cl. ...................... 375/372; 370/230
(58) Field of Classification Search ............... 370/352, 370/230, 516; 375/372
See application file for complete search history.

(56) References Cited

U.S. PATENT DOCUMENTS

| | | | |
|---|---|---|---|
| 6,683,889 B1 * | 1/2004 | Shaffer et al. | 370/516 |
| 6,693,921 B1 * | 2/2004 | Whitfield | 370/516 |
| 6,747,999 B1 * | 6/2004 | Grosberg et al. | 370/516 |
| 7,170,856 B1 * | 1/2007 | Ho et al. | 370/230 |
| 7,336,652 B2 * | 2/2008 | Noguchi et al. | 370/352 |
| 7,349,330 B1 | 3/2008 | Hayakawa et al. | |
| 7,746,770 B2 * | 6/2010 | Usuda et al. | 370/229 |
| 2004/0057445 A1 * | 3/2004 | LeBlanc | 370/412 |
| 2005/0041644 A1 * | 2/2005 | Noguchi et al. | 370/352 |
| 2006/0212617 A1 * | 9/2006 | Horio et al. | 710/52 |
| 2009/0109881 A1 * | 4/2009 | Li et al. | 370/280 |

FOREIGN PATENT DOCUMENTS

| | | |
|---|---|---|
| JP | 11-355283 | 12/1999 |
| JP | 2001-274829 | 10/2001 |
| JP | 2003-087317 | 3/2003 |
| JP | 2003-124984 | 4/2003 |
| JP | 2005-269134 | 9/2005 |

OTHER PUBLICATIONS

Japanese Office Action dated Oct. 7, 2008, with English translation of the relevant portion, from the corresponding Japanese Application No. 2005-051993.
Japanese Office Action dated Aug. 3, 2010, from the corresponding Japanese Application.
Japanese Office Action dated Nov. 9, 2010, from the corresponding Japanese Application.

* cited by examiner

*Primary Examiner* — Jean B Corrielus
(74) *Attorney, Agent, or Firm* — Katten Muchin Rosenman LLP

(57) ABSTRACT

A data output apparatus accumulates received sound data in an accumulating unit (jitter buffer), and reproduces sound based on the accumulated sound data. Then, for a predetermined period of time from the time point at which reception of data starts, the data output apparatus restricts or prohibits discarding of data based on an upper accumulation limit amount as a basis for discarding the accumulated data. Moreover, prior to starting reception of sound data after a transfer of a transmission right, dummy data such as soundless data is accumulated in the accumulating unit. Further, the set values of the upper accumulation limit amount, etc. optimized in the previous communication are stored, and the settings stored in association with a transmitting source apparatus are set as the upper accumulation limit amount, etc. after the transfer of the transmission right.

12 Claims, 15 Drawing Sheets

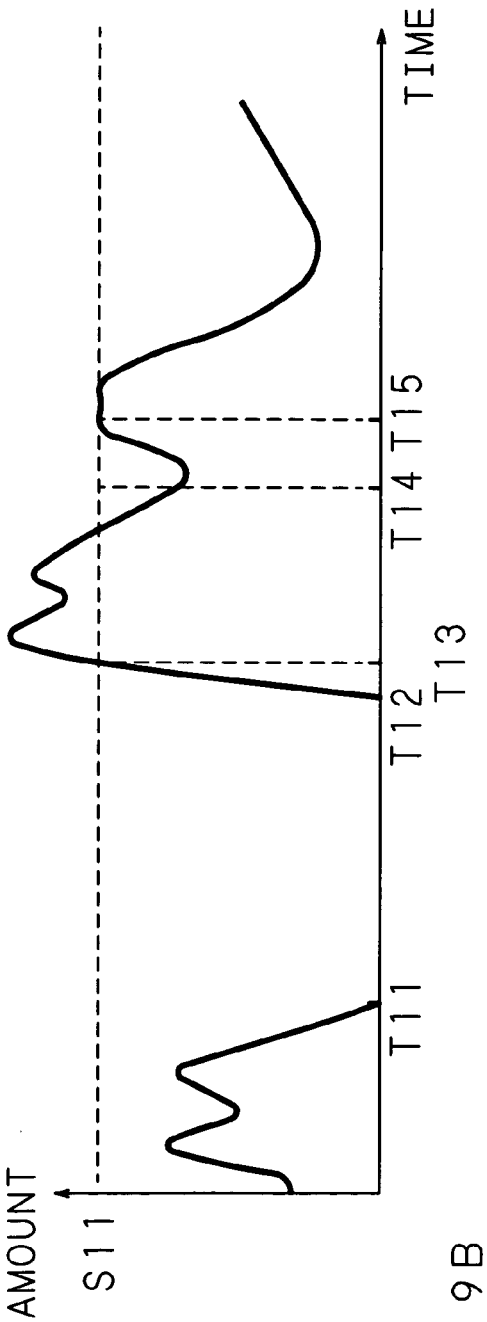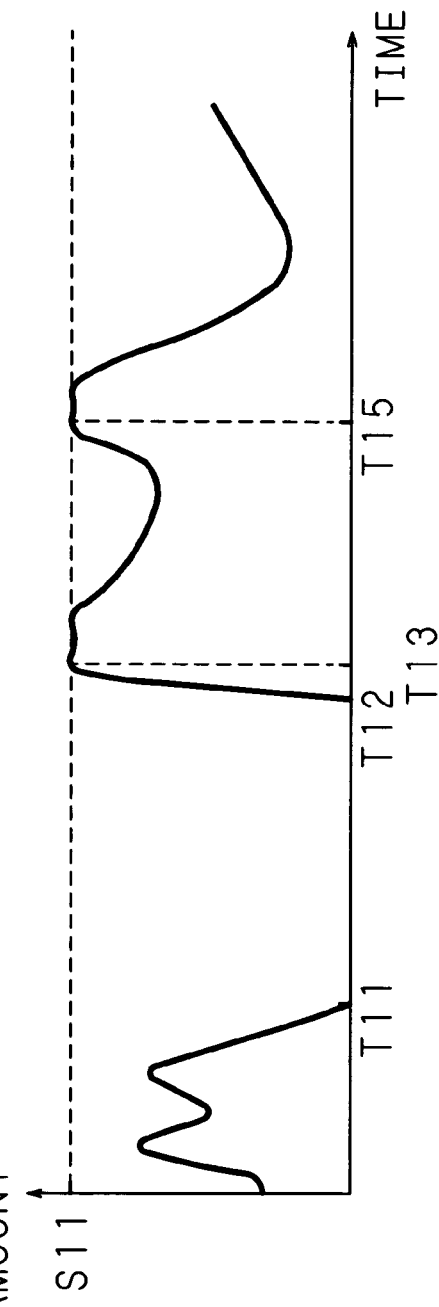

DATA OUTPUT METHOD, DATA OUTPUT APPARATUS AND COMMUNICATION SYSTEM

CROSS-REFERENCE TO RELATED APPLICATION

This non-provisional application claims priority under 35 U.S.C. §119 (a) on Patent Application No. 2005-51993 filed in Japan on Feb. 25, 2005, the entire contents of which are hereby incorporated by reference.

BACKGROUND OF THE INVENTION

1. Field of the Invention

The present invention relates to a data output method for temporarily accumulating received data and performing output based on the accumulated data, a data output apparatus adopting such a data output method, and a communication system including such a data output apparatus. In particular, the present invention relates to a data output method, a data output apparatus, and a communication system suitable for real-time communication such as VoIP and streaming distribution.

2. Description of Related Art

In recent years, there is an increasing use of applications that enable real-time communication such as VoIP (Voice over Internet Protocol), VoPN (Voice over Packet Network) and streaming distribution in which voice and/or video data is transmitted and received between apparatuses through a communication network such as an IP network. In particular, IP telephony that is one example of such applications is spread rapidly. In the IP telephony system, by transmitting and receiving voice data in the form of packets through an IP network, communication is realized between an apparatus at the transmitting end of packets and an apparatus at the receiving end of packets. However, in the communication through the IP network, since the arrival delay time required for transferring packets from the apparatus at the transmitting end to the apparatus at the receiving end varies depending on each packet, there is a problem of jitter. The jitter in the arrival delay time is a serious problem for IP telephony that is required to perform real-time and continuous communication. In order to solve such a problem, in the IP telephony system, the apparatus at the receiving end of packets is provided with a buffer called a "jitter buffer". The apparatus (IP phone set) at the receiving end having the jitter buffer realizes stable voice outputted by temporarily accumulating received packets in the jitter buffer and absorbing the jitter in the arrival delay time before outputting the packets as voice.

In order to solve such a problem, in the IP telephony system, the apparatus at the receiving end of packets is provided with a buffer called a "jitter buffer". The apparatus (IP phone set) at the receiving end having the jitter buffer realizes stable voice outputted by temporarily accumulating received packets in the jitter buffer and absorbing the jitter in the arrival delay time before outputting the packets as voice. For the jitter buffer, an initial accumulation amount to be used as a basis for starting to output the accumulated packets and an upper accumulation limit to be used as a basis for discarding the accumulated packets are set. Therefore, the apparatus at the receiving end of packets starts to accumulate the packets after starting reception of the packets, starts to output (reproduce) voice based on the packets accumulated so far at the time point the accumulated amount of packets reaches the initial accumulation amount, and discards the received packet when the accumulated amount of packets exceeds the upper accumulation limit.

When outputting voice using the jitter buffer in such a manner, the larger the accumulation capacity of the jitter buffer for accumulating packets, the greater the ability of absorbing the jitter in the arrival delay time, but there is a problem that the delay from the arrival of a packet to the output of the packet becomes larger. In order to solve such a problem, Japanese Patent Application Laid-Open No. 2003-87317 discloses a method in which an arrival delay time is calculated by measuring the arrival time intervals of packets, and a discard threshold value, namely the accumulation capacity of the jitter buffer is determined based on the jitter in the calculated arrival delay time.

Moreover, a PoC (Push-to-Talk over Cellular) service that enables the IP telephony technique to be used in a manner similar to transceivers and is capable of transmitting packets including voice data to a plurality of apparatuses in a broadcast manner has attracted the attention. The characteristics of the PoC service include a half-duplex communication in which one of a plurality of apparatuses acquires a transmission right to transmit voice data and the apparatus having the transmission right transmits voice data to the other apparatuses in a broadcast manner, and the ability to perform simultaneous communication among three or more apparatuses.

However, when the technique disclosed in Japanese Patent Application Laid-Open No. 2003-87317 that is the full duplex communication is applied to the above-mentioned PoC service of half-duplex communication in which an apparatus having the transmission right changes frequently, the following problems arise.

Specifically, immediately after the transfer of the transmission right from one apparatus to another, there is a high possibility that burst reception of packets including voice data may occur in the apparatus at the receiving end, and thus there is also a high possibility that the accumulated amount in the jitter buffer may exceed the upper accumulation limit of the apparatus at the receiving end. Consequently, since the apparatus at the receiving end has no choice but to discard a large amount of the received voice data, there arises the problem of deterioration of sound quality. Thus, for the PoC service in which the transmission right is transferred frequently among a plurality of apparatuses, the above-mentioned deterioration of sound quality is a problem that cannot be ignored.

Moreover, when the transmission right is transferred from a certain apparatus and the certain apparatus becomes the apparatus at the receiving end, the jitter buffer of the apparatus at the receiving end is empty. Therefore, until the accumulated amount of voice data received immediately after the transfer of the transmission right reaches the initial accumulation amount, the reproduction of voice based on voice data is not started, and there is a problem that a delay in voice reproduction occurs. In the PoC service in which the transmission right is transferred frequently, reproduction delay that occurs in such a situation is a problem that cannot be ignored.

Further, since a communication route until the voice data transmitted from a transmitting source apparatus reaches an apparatus at the receiving end varies depending on each transmitting source apparatus, the state of delay in the apparatus at the receiving end also varies depending on each transmitting source apparatus. Hence, for example, in a method of optimizing parameters necessary for the management of the buffer after starting to receive data as disclosed in the Japanese Patent Application Laid-Open No. 2003-87317, it is necessary to perform the process of optimizing the parameters whenever the transmission right is transferred, and consequently there arises the problem of deterioration of sound quality until the optimization of the parameters has been completed. For the PoC service in which communication among three or more apparatuses is realized and the transmission right is transferred frequently, such deterioration of sound quality is a problem that cannot be ignored.

BRIEF SUMMARY OF THE INVENTION

The present invention has been made with the aim of solving the above problems, and it is an object of the present invention to provide a data output method capable of preventing deterioration of sound quality when burst reception of voice data occurs immediately after a transfer of the transmission right, a data output apparatus adopting such a data output method, and a communication system including such a data output apparatus.

More precisely, the present invention adopts a configuration for restricting discarding of data based on a preset upper accumulation limit for a predetermined period of time when starting reception of data by an apparatus at the receiving end. With this configuration, it is possible to handle burst reception of voice data immediately after a transfer of the transmission right.

Moreover, the present invention adopts a configuration for accumulating, in advance, dummy data in the jitter buffer before the apparatus at the receiving end starts reception of data. Hence, in the apparatus at the receiving end immediately after the transfer of the transmission right to another apparatus, the jitter buffer does not become empty, and it is possible to prevent the occurrence of delay in voice reproduction.

Further, the present invention adopts a configuration in which a transmitting source apparatus of data that starts to be received by an apparatus at the receiving end is identified, various parameters pre-stored in association with the identified transmitting source apparatus are read, and the parameters of the apparatus at the receiving end are set based on the read parameters. Thus, since the apparatus at the receiving end can quickly re-optimize the parameters, it is possible to prevent deterioration of sound quality.

According to the first aspect of the invention, there is provided a data output method for accumulating received data in a data accumulating unit to which an upper accumulation limit amount as a basis for discarding accumulated data is set, and performing output based on the data accumulated in the data accumulating unit, and characterized in that discarding of the data accumulated in the data accumulating unit based on a set value of the upper accumulation limit amount is restricted for a predetermined period of time from a time point at which reception of data starts.

According to the first aspect of the invention, there is provided a data output apparatus having a data accumulating unit, to which an upper accumulation limit amount as a basis for discarding accumulated data is set, for accumulating received data in the data accumulating unit and performing output based on the data accumulated in the data accumulating unit, and characterized by comprising restricting means for restricting discarding of the data accumulated in the data accumulating unit based on a set value of the upper accumulation limit amount for a predetermined period of time from a time point at which reception of data starts.

The first aspect of the invention is applied, for example, to an apparatus at the receiving end of the PoC service in which one apparatus having a transmission right among a plurality of apparatuses transmits data to the other apparatuses in a broadcast manner. When starting reception of data transmitted from an apparatus that has newly acquired the transmission right after a transfer of the transmission right from one apparatus, a restriction such as prohibiting the discarding of the accumulated data is imposed, and therefore even when burst reception of data occurs immediately after the transfer of the transmission right, the data will not be discarded based on the upper accumulation limit. Thus, it is possible to prevent the occurrence of sound interruption and the resulting deterioration of sound quality.

Note that when the restriction on the discarding of data is released after elapse of a predetermined period of time since the start of reception, it is also possible to optimize the accumulation amount after the burst reception of data is settled.

A data output method according to the second aspect of the invention is based on the first aspect, and characterized in that an initial accumulation amount as a basis for starting to output the accumulated data is further set to the data accumulating unit, and dummy data is stored in an amount not exceeding the initial accumulation amount in advance in the data accumulating unit prior to starting reception of data.

A data output apparatus according to the second aspect of the invention is based on the first aspect, and characterized in that an initial accumulation amount as a basis for starting to output the accumulated data is further set to the data accumulating unit, and the data output apparatus further comprises: dummy data storing means for storing in advance dummy data to be accumulated in the data accumulating unit; and dummy data accumulating means for accumulating the dummy data stored in the dummy data storing means in an amount not exceeding the initial accumulation amount in advance in the data accumulating unit prior to starting reception of data.

The second aspect of the invention is applied, for example, to an apparatus at the receiving end of the PoC service in which one apparatus having a transmission right among a plurality of apparatuses transmits data to the other apparatuses in a broadcast manner. Prior to starting reception of data transmitted from an apparatus that has newly acquired the transmission right after a transfer of the transmission right from one apparatus, dummy data such as soundless data or data for outputting a predetermined sound is accumulated in the accumulating unit in advance. Consequently, the output based on the data accumulated in the data accumulating unit is always performed. Therefore, when reception of data from an apparatus that has newly acquired the transmission right is started, the output is started immediately without waiting for the accumulated amount of data to reach the initial accumulation amount, and thus it is possible to prevent the occurrence of delay when starting output.

A data output method according to the third aspect of the invention is based on the second aspect, and characterized in that a transmitting source apparatus of data is identified when starting reception of data, set values of the upper accumulation limit amount and the initial accumulation amount stored in association with the identified transmitting source apparatus are read, and the upper accumulation limit amount and the initial accumulation amount are set based on the read set values.

A data output apparatus according to the third aspect of the invention is based on the second aspect, and characterized by further comprising: set-values storing means for storing set values of the upper accumulation limit amount and the initial accumulation amount in association with identification information for identifying a transmitting source apparatus during reception of the data; transmitting source apparatus identifying means for identifying a transmitting source apparatus of data when starting reception of the data; set-values reading means for reading the set values stored in the set-values storing means in association with the identification information identifying an apparatus identified by the transmitting source apparatus identifying means; and means for setting the upper accumulation limit amount and the initial accumulation amount based on the set values read from the storing means by the set-values reading means.

The third aspect of the invention is applied, for example, to an apparatus at the receiving end of the PoC service in which one apparatus having a transmission right among a plurality of apparatuses transmits data to the other apparatuses in a broadcast manner. Further, the set values of the upper accumulation limit, the initial accumulation amount, etc. optimized when data was received from one apparatus are stored in association with information for identifying the transmitting source apparatus, and when reception from the apparatus is resumed again, the previously stored set values are set. Consequently, since the appropriate set values of the upper accumulation limit, initial accumulation limit, etc. are set as the initial values, the accumulated amount of data is managed by the appropriate set values even before the optimization of set values after resuming the reception. It is therefore possible to prevent deterioration of sound quality due to inappropriate set values of the upper accumulation limit, initial accumulation amount, etc.

A communication system according to the fourth aspect of the invention comprises a plurality of data output apparatuses defined in any one of the first through third aspects, and characterized in that one data output apparatus having a transmission right among the plurality of data output apparatuses has a transmission right to transmit data to the other data output apparatuses in a broadcast manner, and, when the data output apparatus having the transmission right releases the transmission right, the other data output apparatuses start receiving data.

When the fourth aspect of the invention is applied to an apparatus such as an IP telephony terminal apparatus at the receiving end having a transceiver function for use in the PoC service for reproducing sound based on the received sound data, the communication quality is improved.

The above and further objects and features of the invention will more fully be apparent from the following detailed description with accompanying drawings.

BRIEF DESCRIPTION OF THE SEVERAL VIEWS OF THE DRAWINGS

FIG. 9A and FIG. 9B are graphs showing a change with time in the accumulated amount of data in the data output apparatus of Embodiment 1 of the present invention;

DETAILED DESCRIPTION OF THE PRESENT INVENTION

The following description will explain in detail the present invention, based on the drawings illustrating preferred embodiments thereof.

Embodiment 1

Figure 1:
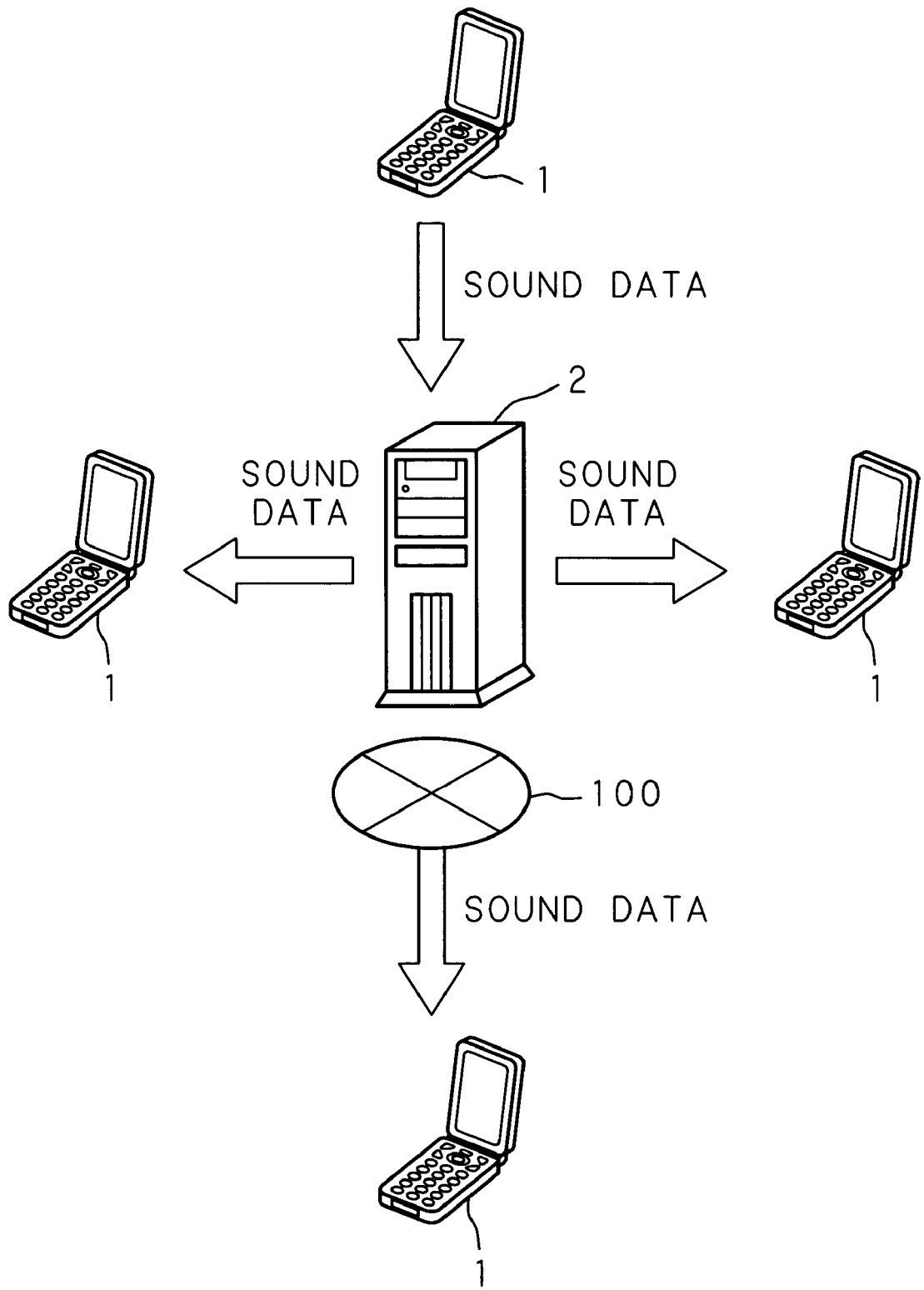
FIG. 1 is a schematic view showing conceptually an example of the configuration of a communication system of Embodiment 1 of the present invention.

FIG. 1 is a schematic view showing conceptually an example of the configuration of a communication system of Embodiment 1 of the present invention.

In FIG. 1, reference numerals 1, 1, ... represent data output apparatuses of the present invention, and computers for communication, such as an IP telephony terminal apparatus having a transceiver function capable of using the PoC (Push-to-Talk over Cellular) service, are used. One data output apparatus 1 is connected to a communication network 100 such as a VoIP network, and performs packet communication with other data output apparatuses 1, 1, ... through a relay of a relay apparatus 2 such as a PoC server computer. The communication achieved by the PoC service is half-duplex communication conducted among a group of a plurality of data output apparatuses 1, 1, ... under the management of the relay apparatus 2. More specifically, one data output apparatus 1 having a transmission right generates packets including sound data for outputting inputted sound, and transmits the generated packets to other data output apparatuses 1, 1, ... in a broadcast manner through the relay apparatus 2. The other data output apparatus 1 that has received the packets including sound data outputs sound based on the sound data included in the received packets. Note that the transmission right does not continue to be held by the one data output apparatus 1, and is transferred to other data output apparatus 1 that made a request for the transmission right. The packets including sound data are based on standards such as RTP (Real-time point Transport Protocol) that is a communication protocol for use in VoIP communication.

Figure 2:
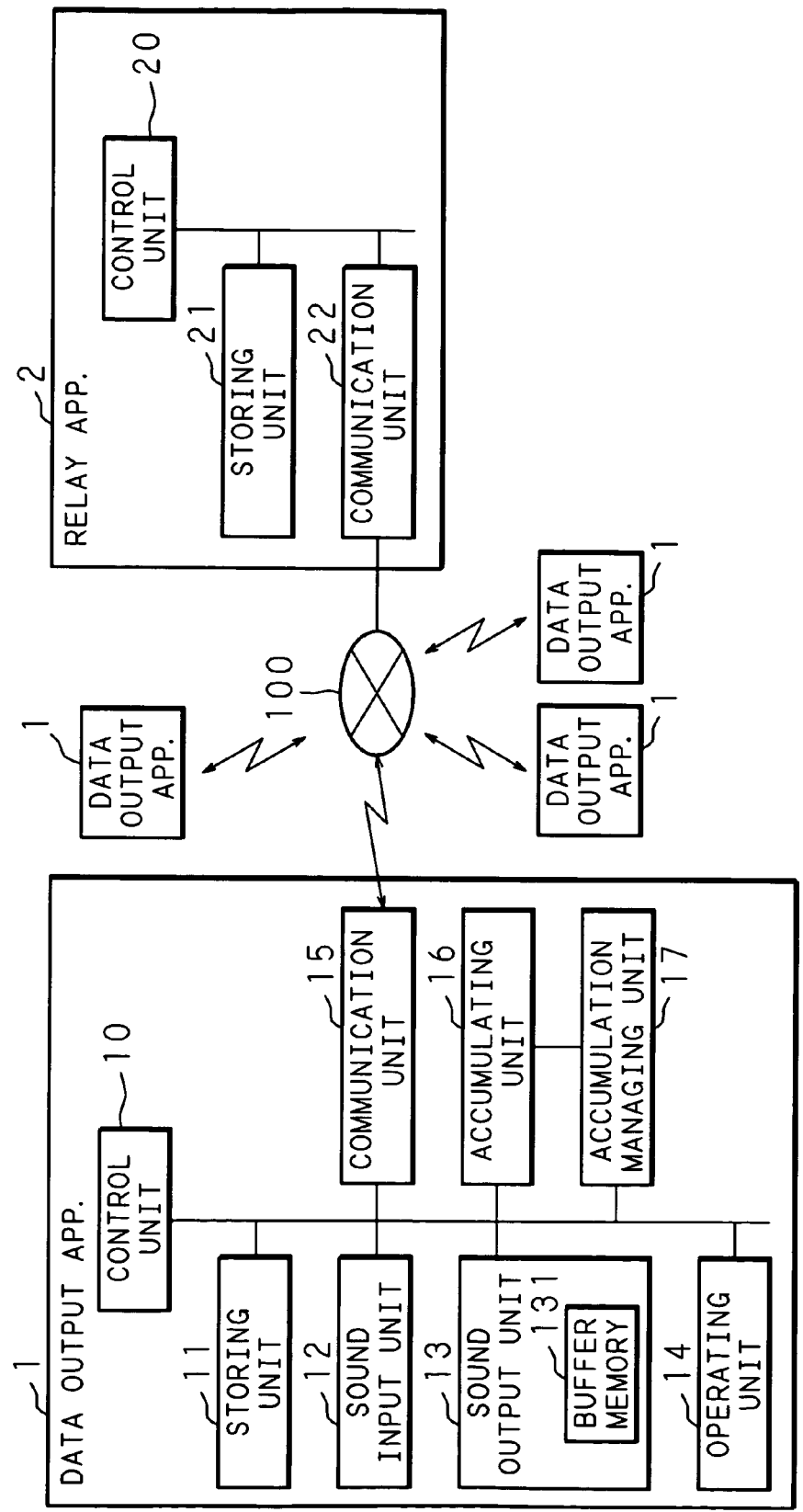
FIG. 2 is a block diagram showing an example of the configurations of various apparatuses included the communication system of Embodiment 1 of the present invention.

FIG. 2 is a block diagram showing an example of the internal configurations of various apparatuses used in the communication system of Embodiment 1 of the present invention.

The data output apparatus 1 comprises a control unit 10 for controlling the whole apparatus. Connected through a bus to the control unit 10 are various circuits including a storing unit 11 composed of volatile and non-volatile memory for storing various types of information such as computer programs and data, a sound input unit 12 such as a microphone for receiving input of sound, a sound output unit 13 such as a speaker for outputting sound, an operating unit 14 including various push buttons, a communication unit 15 to be connected to the communication network 100, an accumulating unit 16 for use as a communication buffer, and an accumulation managing unit 17 for controlling the accumulation of data in the accumulating unit 16.

The data output apparatus 1, under the control of the control unit 10, converts sound received as an input of analog data from the sound input unit 12 into digital data, divides the sound data in the form of digital data into a predetermined data length, and transmits the data as packets from the communication unit 15 to the communication network 100. Moreover, the data output apparatus 1, under the control of the control unit 10, receives packets including sound data by the communication unit 15 from the communication network 100, and temporarily accumulates the sound data included in the received packets in the accumulating unit 16. The sound data accumulated in the accumulating unit 16 is outputted to the sound output unit. The sound output unit 13 is composed of a voice chip, and has a buffer memory 131. Therefore, the sound output unit 13 accumulates the received sound data in the buffer memory 131, converts the accumulated sound data into analog data, and outputs the sound data as sound at a predetermined time interval set as an output interval. The operating unit 14 of the data output apparatus 1 includes various push buttons such as number keys, symbol keys and various kinds of function keys, for example, and has a PoC key as one function key to be used exclusively for requesting the transmission right.

Various circuits such as a control unit 20, a memory unit 21 and a communicating unit 22 are connected to the relay apparatus 2 through a bus. The relay apparatus 2 manages a group of data output apparatuses 1, 1, . . . that perform communication based on the PoC service, and the data output apparatus 1 having the transmission right in the group. More specifically, upon a request for the transmission right from one data output apparatus 1, the relay apparatus 2 performs a process for acquiring the transmission right, and upon a request for releasing the transmission right from one data output apparatus 1, the relay apparatus 2 performs a process for releasing the transmission right.

Figure 3:
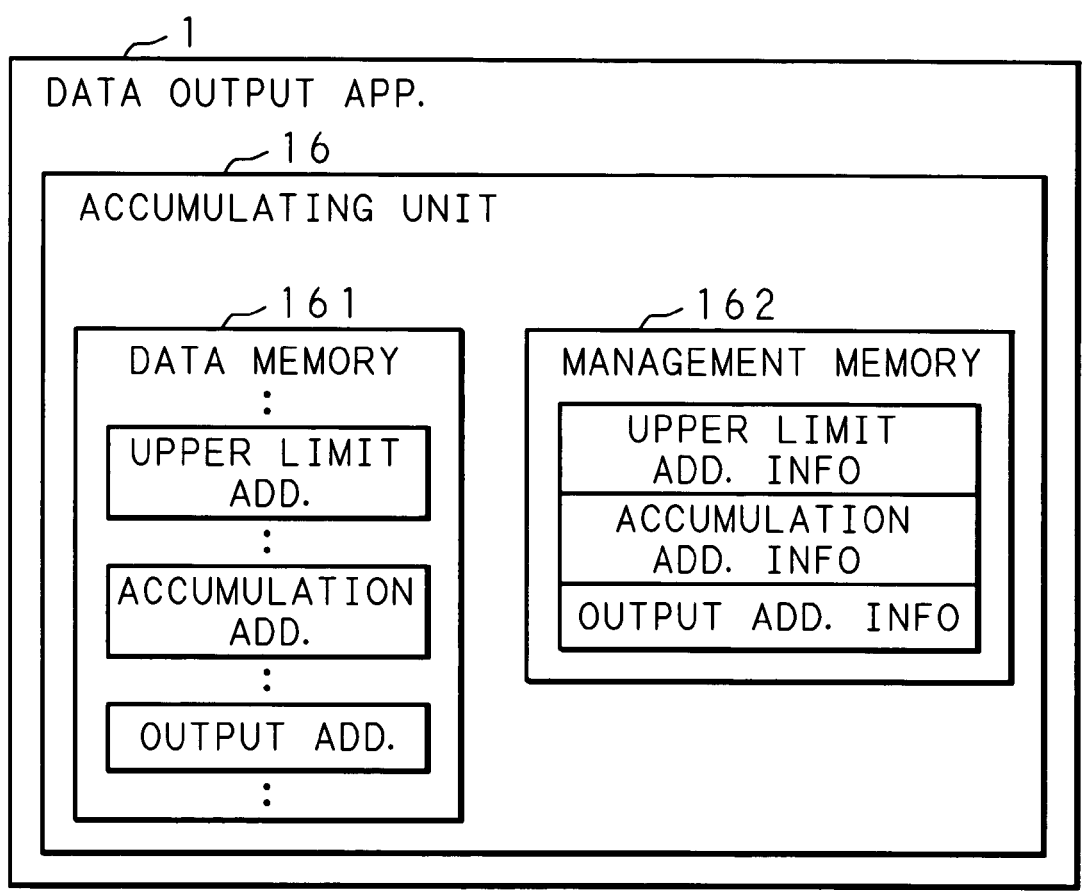
FIG. 3 is a block diagram showing an example of the functional configuration of an accumulating unit of a data output apparatus of Embodiment 1 of the present invention.

FIG. 3 is a block diagram showing an example of the functional configuration of the accumulating unit 16 of the data output apparatus 1 of Embodiment 1 of the present invention. The accumulating unit 16 has a data memory 161 for accumulating sound data included in the received packets, and a management memory 162 for use in managing the sound data accumulated in the data memory 161.

The management memory 162 stores output address information indicating an output address showing a location up to which output of sound data accumulated in the data memory 161 to the sound output unit 13 has been completed; accumulation address information indicating an accumulation address showing a location up to which the sound data has been accumulated; and an upper limit address information indicating an upper limit address showing a location up to which data can be accumulated.

The sound data included in the packets received by the communication unit 15 is started to be accumulated from the location indicated by the accumulation address information in the data memory 161, and the accumulation address information is updated according to the amount of accumulated data. However, when data is accumulated and the location indicated by the accumulation address information exceeds the location indicated by the upper limit address information, the data is accumulated in the data memory 161 up to the location indicated by the upper limit address information, but the excess of data is discarded.

When output to the sound output unit 13 has been completed, the output address information is updated to an address indicating the location at which output has been completed, and the upper limit address information is also updated according to the updated output address information. In other words, in the data memory 161, the range from the location indicated by the output address information to the location indicated by the upper limit address information is constant, and the amount of data accumulated based on the addresses within this range will be the upper limit of the accumulated amount of data in the data memory 161, that is, the upper limit of the accumulated amount of data in the data output apparatus 1. Note that, a range from a location indicating by the output address information to a location indicating by the upper limit address information is determined by the upper accumulation limit amount managed by the accumulation managing unit 17.

Note that when the location indicated by the upper limit address information exceeds the end of the data memory 161, the location indicated by the upper limit address information becomes the start address of the data memory 161. The same thing can also be said for the accumulation address information and the output address information. In short, the data memory 161 is a virtual ring-structured memory.

Figure 4:
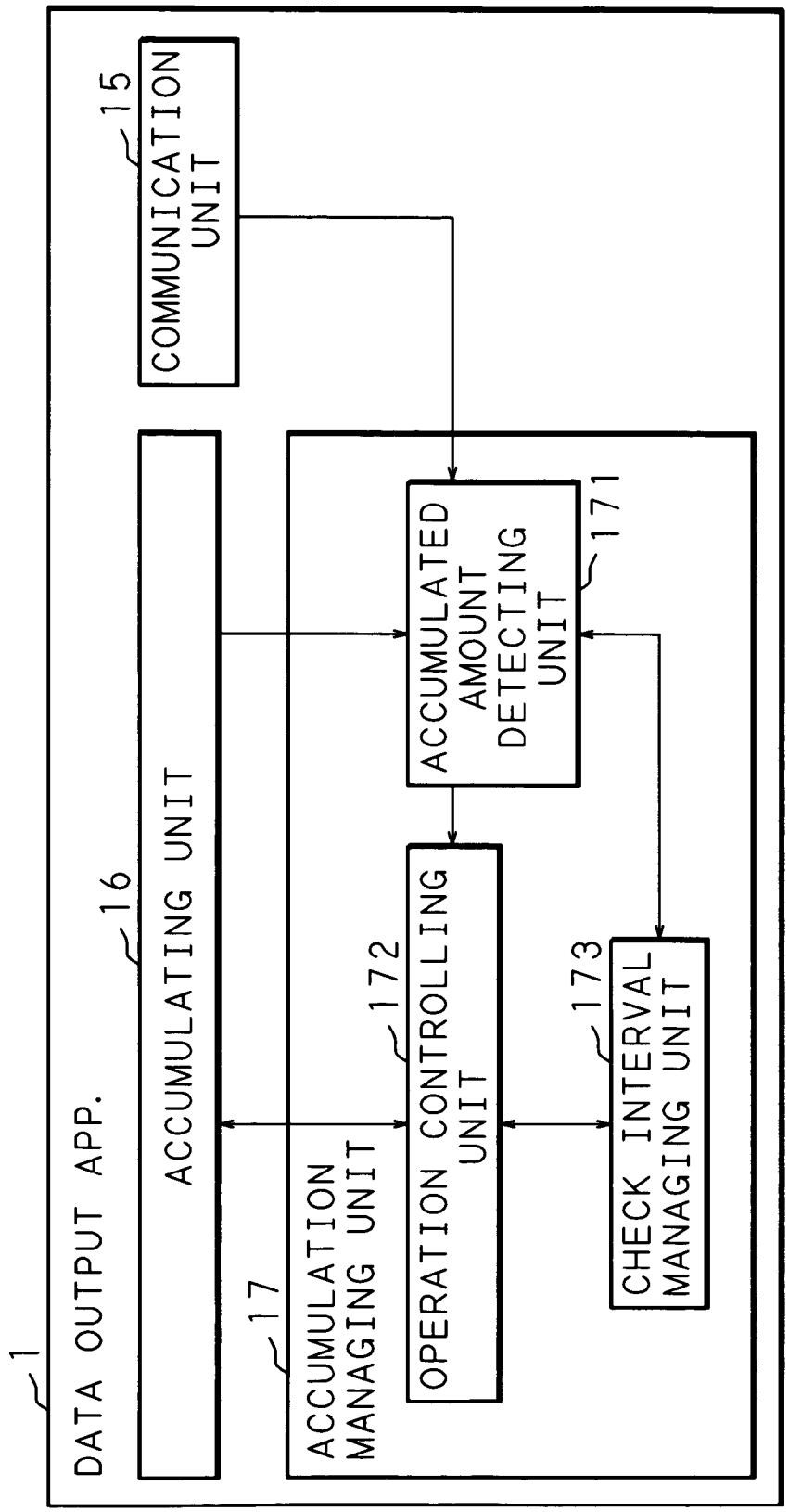
FIG. 4 is a block diagram showing an example of the functional configuration of an accumulation managing unit of the data output apparatus of Embodiment 1 of the present invention.

FIG. 4 is a block diagram showing an example of the functional configuration of the accumulation managing unit 17 of the data output apparatus 1 of Embodiment 1 of the present invention.

The accumulation managing unit 17 comprises modules composed of hardware and software, such as an accumulated amount detecting unit 171 for detecting the amount of sound data that has not yet been outputted and has been accumulated in the accumulating unit 16 based on the output address information and the accumulation address information; an operation controlling unit 172 for controlling the operation relating to the accumulation in the accumulating unit 16 based on the data amount detected by the accumulated amount detecting unit 171; and a check interval managing unit 173 for managing the time interval of checking the accumulation state of sound data by the accumulated amount detecting unit 171.

As parameters necessary for management, the accumulated amount detecting unit 171 stores various data, such as a minimum accumulated amount indicating the minimum value of the accumulated amount of sound data accumulated in the accumulating unit 16, and a constant delay reference amount as a basis for detecting a later-described constant delay. Moreover, the accumulated amount detecting unit 171 outputs the detected accumulated amount of sound data in the accumulating unit 16 to the operation controlling unit 172. Further, the accumulated amount detecting unit 171 compares the detected accumulated amount with the stored minimum accumulated amount, and updates the value shown by the minimum accumulated amount when the detected accumulated amount is less than the minimum accumulated amount.

In addition, when the accumulated amount detecting unit 171 detects the reception of sound data in the form of packets, it outputs a signal indicating this fact to the check interval managing unit 173 and receives a signal indicating that it is the time point to detect the constant delay from the check interval managing unit 173.

As parameters necessary for control, the operation controlling unit 172 stores various data, such as an initial accumulation amount indicating a reference data location for starting to output the sound data accumulated in the accumulating unit 16, and an upper accumulation limit amount indicating an upper limit value of sound data to be accumulated in the accumulating unit 16.

Further, the operation controlling unit 172 manages a discarding restriction flag that indicates whether or not to restrict the discarding of sound data, and the discarding restriction timer when the accumulated amount of sound data accumulated in the accumulating unit 16 reaches the upper accumulation limit amount. When the discarding restriction flag is "0" and the accumulated amount of sound data reaches the upper accumulation limit amount, the data output apparatus 1 discards the sound data. On the other hand, when the discarding restriction flag is "1" and the accumulated amount of sound data reaches the upper accumulation limit amount, the data output apparatus 1 restricts the discarding of sound data. The restriction on the discarding of sound data in the data output apparatus 1 means prohibiting the discarding of sound data based on the upper accumulation limit amount. The discarding restriction timer measures a time relating to the restriction on the discarding of sound data, and the state of restricting the discarding of sound data continues based on the measured time.

As parameters necessary for managing the check interval, the check interval managing unit 173 stores various data, such as a reception counter for counting the number of received packets, a set period of the check interval. Moreover, when the check interval managing unit 173 receives a signal indicating the reception of a sound data in the form of packet from the accumulated amount detecting unit 171, it increments the value of the reception counter by "1". Further, when the value of the reception counter reaches the set value of check interval, the check interval managing unit 173 outputs a signal indicating that it is the time point to detect the constant delay to the accumulated amount detecting unit 171 and initializes the value of the reception counter to "0".

The basic operation of the above-mentioned accumulation managing unit 17 is as follows. When the data output apparatus 1 starts communication, the sound data included in packets received by the communication unit 15 is accumulated in the accumulating unit 16. Then, the accumulated amount detecting unit 171 detects the accumulated data amount, and outputs information showing the detected data amount to the operation controlling unit 172. When the operation controlling unit 172 judges, based on the information received from the accumulated amount detecting unit 171, that the data amount has reached the initial accumulation value, it starts outputting the sound data accumulated in the accumulating unit 16. Moreover, the operation controlling unit 172 sets the upper limit address information of the data memory 161 of the accumulating unit 16, based on the accumulation upper limit amount.

Next, the relationship between the accumulated amount in the accumulating unit 16 managed by the accumulation managing unit 17 and a delay will be explained.

Figure 5:
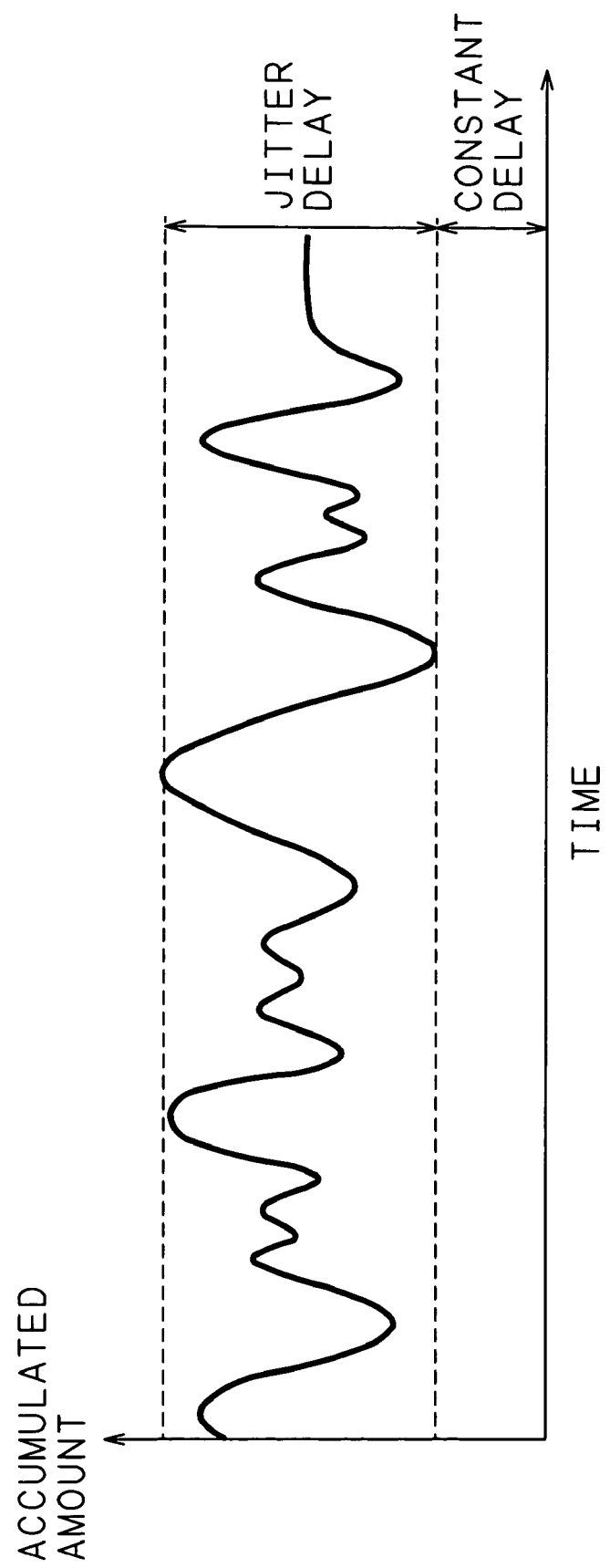
FIG. 5 is a graph showing a change with time in the accumulated amount of sound data in the data output apparatus of Embodiment 1 of the present invention.

FIG. 5 is a graph showing an example of a change with time in the accumulated amount of sound data in the data output apparatus 1 of Embodiment 1 of the present invention. FIG. 5 shows the relationship by plotting time in the axis of abscissas and the accumulated amount in the axis of ordinates. As shown in FIG. 5, the accumulated amount of sound data in the accumulating unit always changes, and the content can be classified into an accumulated amount due to jitter delay depending on the jitter in the communication state, and an accumulated amount due to constant delay that is accumulated constantly.

Therefore, the accumulating unit 16 needs a capacity capable of accumulating the sum of the accumulated amount due to constant delay and the accumulated amount due to jitter delay. For example, when the accumulation capacity of the accumulating unit 16 is decreased, when the jitter delay increases, the frequency of running out of sound data accumulated in the accumulating unit 16 for output becomes higher, and consequently the possibility of output interruption increases. Hence, it is necessary to ensure an appropriate accumulation capacity for the accumulating unit 16. However, since the accumulated amount due to constant delay may cause a fixed output delay, it is preferred to reduce the accumulated amount due to constant delay.

For the above-mentioned reasons, the data output apparatus 1 of the present invention checks the amount of constant delay in each check time point based on the check interval managed by the check interval managing unit 173, and reduces the output delay by discarding a part of the sound data accumulated in the accumulating unit 16 when a constant delay that cannot be ignored has occurred.

Figure 6A:
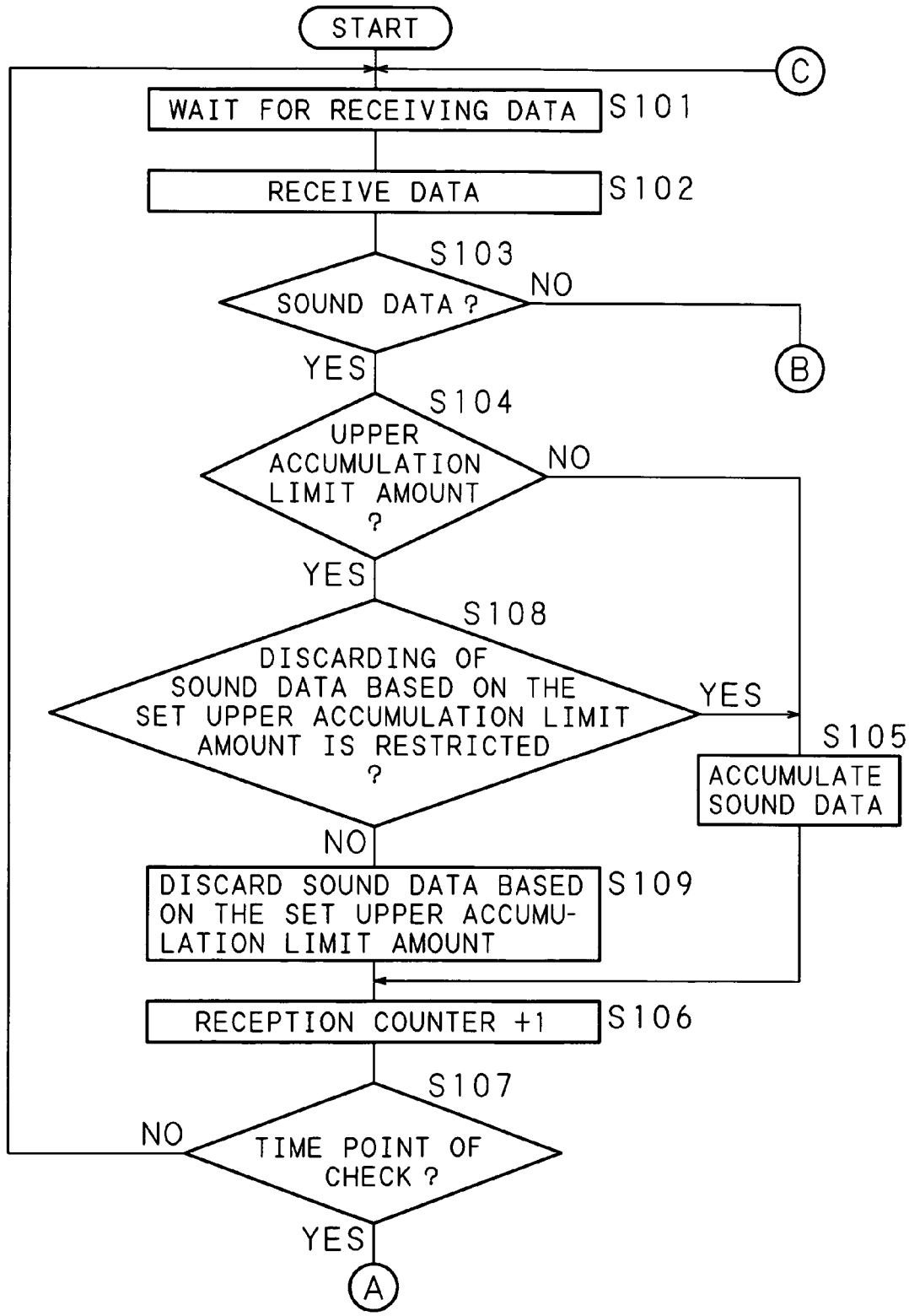
FIG. 6A, FIG. 6B and FIG. 6C are flowcharts showing the procedure of an accumulation process performed by the data output apparatus of Embodiment 1 of the present invention.
Figure 6B:
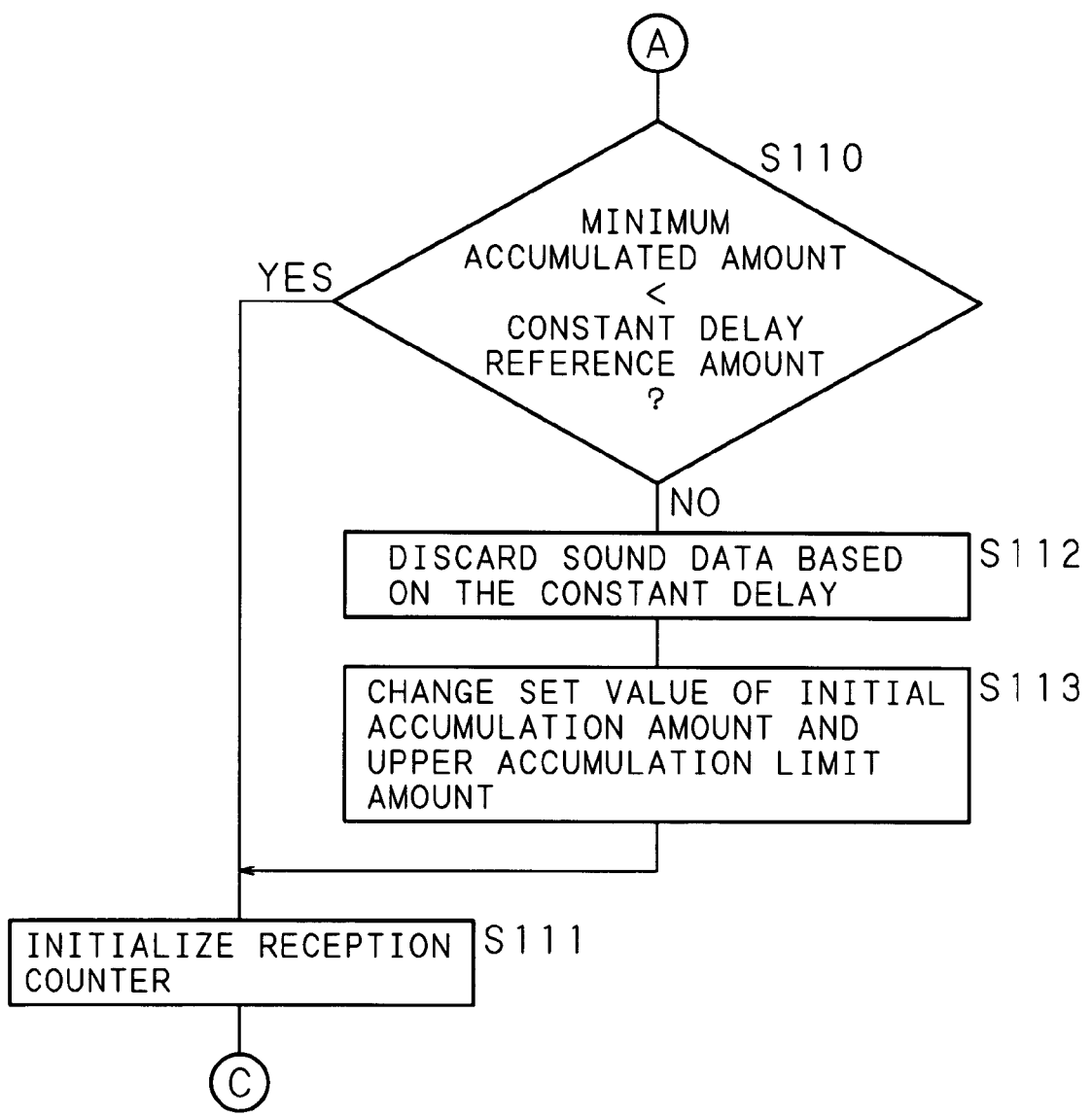
Figure 6C:
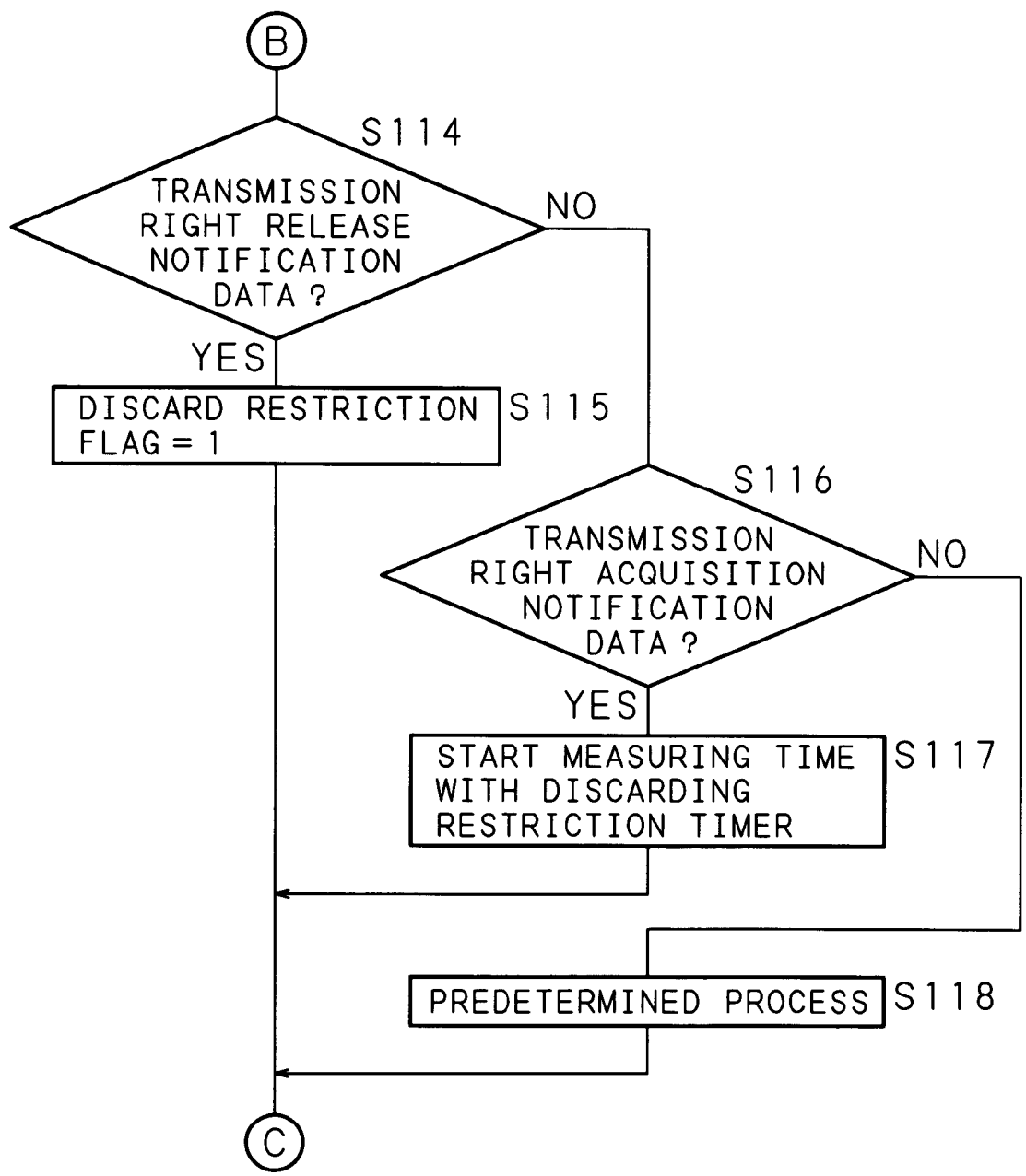

Next, the following description will explain the processes performed by the data output apparatus 1 of Embodiment 1 of the present invention. FIG. 6A, FIG. 6B and FIG. 6C illustrate flowcharts showing the procedure of an accumulation process performed by the data output apparatus 1 of Embodiment 1 of the present invention. According to a computer program stored in the memory unit 11, the control unit 10 executes the process.

The control unit 10 of the data output apparatus 1 waits for receiving data in the form of a packet that is transmitted from the relay apparatus 2 through the communication network 100 (S101), and causes the communication unit 15 to receive the data in the form of a packet (S102). Then, the control unit 10 judges whether or not the received data is sound data (S103). When a judgment is made in step S103 that the received data is a sound data in the form of a packet transmitted through the relay apparatus 2 from other data output apparatus having the transmission right (S103: YES), the control unit 10 causes the accumulation managing unit 17 to judge whether or not the accumulated amount of sound data stored in the accumulating unit 16 has reached the upper accumulation limit amount (S104).

In step S104, when a judgment is made that the accumulated amount of sound data stored in the accumulating unit 106 has not reached the upper accumulation limit amount (S104: NO), the control unit 10 accumulates the sound data included in the received packet in the accumulating unit 16 (S105), and increments the reception counter by "1" (S106). Then, by comparing the value of the reception counter with the set check interval, the control unit 10 judges whether or not it is the time point to perform a check based on the check interval (S107). When a judgment is made that it is not the time point to perform the check (S107: NO), the control unit 10 returns the process to step S101 and repeats the above-described processing to receive the next packet. Note that the judgment in step S107 is made by comparing the value of the reception counter with the set value representing the check interval.

In step S104, when a judgment is made that the accumulated amount of sound data stored in the accumulating unit 16 has reached the upper accumulation limit amount (S104: YES), the control unit 10 judges whether or not the discarding of sound data in the form of a packet based on the set upper accumulation limit amount is restricted (S108). The judgment in step S108 is made by referring to the discarding restriction flag. More specifically, when the discarding restriction flag is "0", the control unit 10 judges that the discarding of sound data based on the upper accumulation limit amount is not restricted. As a result, the control unit 10 discards the sound data included in the received packet. On the other hand, when the discarding restriction flag is "1", the control unit 10 judges that the discarding of sound data based on the upper accumulation limit amount is restricted, that is, the discarding of sound data is prohibited. Consequently, the control unit 10 accumulates the sound data included in the received packet in the accumulating unit 16.

In step S108, when a judgment is made that the discarding of sound data based on the set upper accumulation limit amount is restricted (S108: YES), the control unit 10 proceeds the process to step S105 and executes the processing from step S106 so as to accumulate the sound data included in the received packet in the accumulating unit 16.

On the other hand, in step S108, when a judgment is made that the discarding of sound data based on the set upper accumulation limit amount is not restricted (S108: NO), the control unit 10 discards the sound data of the received packet (S109), and proceeds the process to step 106 and performs the subsequent processing.

In step S107, when a judgment is made that it is the time point to perform a check (S107: YES), the control unit 10 checks the accumulated state of sound data accumulated in the accumulating unit 16. More specifically, in a check period after the previous check, the control unit 10 judges whether or not the accumulated amount of sound data accumulated in the accumulating unit 16 is less than the constant delay reference amount (S110). The judgment in step S110 is made by comparing the minimum accumulated amount with the constant delay reference amount both managed by the accumulated amount detecting unit 171 in the accumulation managing unit 17

In step S110, when a judgment is made that the accumulated amount of sound data is less than the constant delay reference amount (S110: YES), the control unit 10 judges that a constant delay that cannot be ignored has not occurred. In this case, the control unit 10 initializes the reception counter (S111), and returns the process to step S101 and repeats the above-described processing to receive the next packet. Note that when the reception counter is initialized, the minimum accumulated amount indicating the minimum value of the accumulation amount in the check period is also initialized.

In step S110, when a judgment is made that the accumulated amount of sound data is not less than the constant delay reference amount (S110: NO), the control unit 10 judges that a constant delay that cannot be ignored has occurred. In this case, the control unit 10 discards a part of the sound data accumulated in the accumulating unit 16 (S112), changes by decreasing the set values of the initial accumulation amount and the upper accumulation limit amount according to the constant delay (S113), proceeds the process to step S111 and executes the subsequent processing. Thus, when the accumulated amount of sound data accumulated in the accumulating unit 16 is not less than the predetermined reference amount, the control unit 10 judges that the constant delay has occurred, and executes an optimization process for changing by decreasing the set values of the initial accumulation amount and the upper accumulation limit amount to reduce the occurrence of constant delay.

By the way, in step S103, when a judgment is made that the received data is not sound data (S103: NO), the control unit 10 judges whether or not the received data is transmission right release notification data notifying the release of the transmission right sent from the relay apparatus 2 (S114).

In step S114, when a judgment is made that the received data is the transmission right release notification data (S114: YES), the control unit 10 sets the discard restriction flag to "1" (S115), returns the process to step S101 and repeats the above-described processing so as to receive the next packet. Since the discarding restriction flag is set to "1" by the process of step S115, when other data output apparatus 1 having the transmission right releases the transmission right, the control unit 10 continues the process of restricting the discarding of received sound data until a later-described condition such as a discarding restriction time is satisfied.

In step S114, when a judgment is made that the received data is not the transmission right release notification data (S114: NO), the control unit 10 judges whether or not the received data is transmission right acquisition notification data that notifies acquisition of the transmission right sent from the relay apparatus 1 (S116).

In step S116, when a judgment is made that the received data is the transmission right acquisition notification data (S116: YES), the control unit 10 starts measuring time with the discarding restriction timer (S117), returns the process to step S101 and repeats the subsequent processing to receive the next packet.

In step S116, when a judgment is made that the received data is not the transmission right acquisition notification data (S116: NO), the control unit 10 executes a predetermined process according to the received data (S118), returns the process to step S101 and repeats the subsequent processing to receive the next packet.

Figure 7:
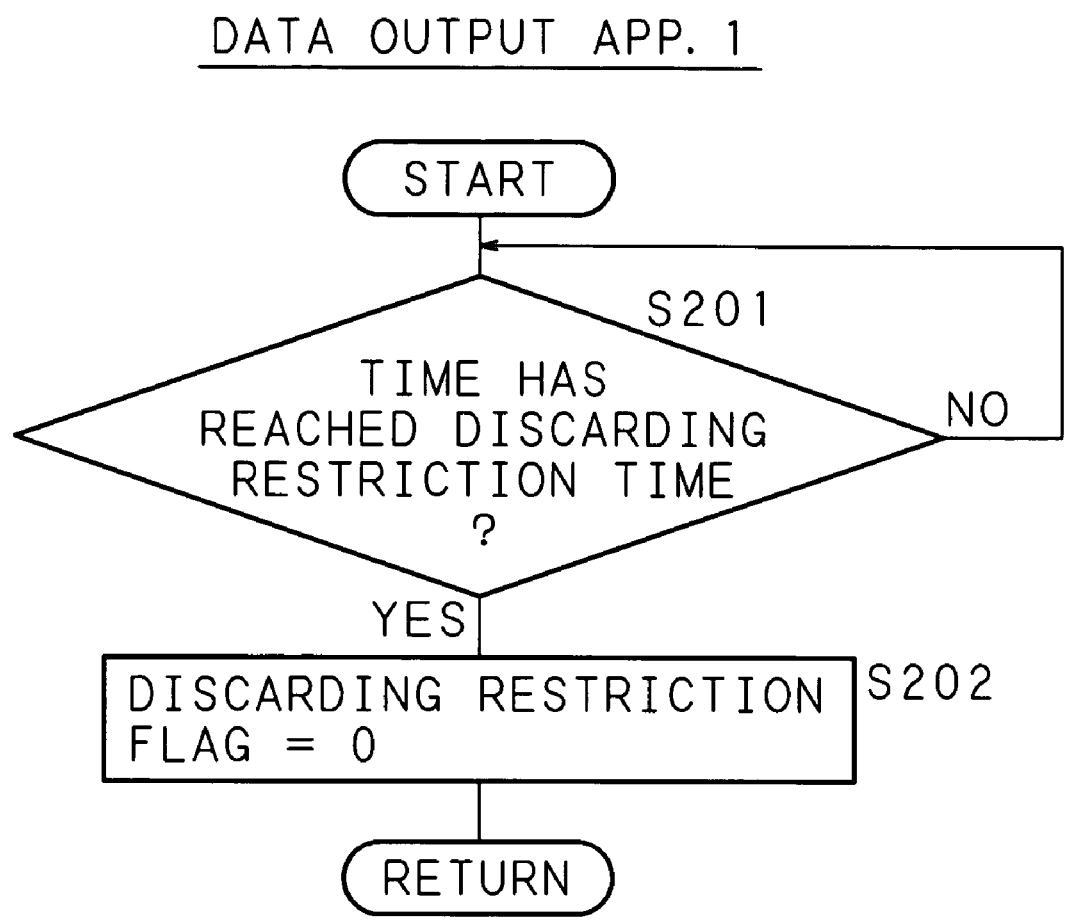
FIG. 7 is a flowchart showing the procedure of a discarding restriction time measuring process performed by the data output apparatus of Embodiment 1 of the present invention.

FIG. 7 is a flowchart showing the procedure of a discarding restriction time measuring process performed by the data output apparatus 1 of Embodiment 1 of the present invention. According to a computer program stored in the memory unit 11, the control unit 10 executes the process.

In step S117 of the accumulation process shown in the flowcharts of FIG. 6A, FIG. 6B and FIG. 6C, when the discarding restriction timer starts measuring time, the discarding restriction time measuring process shown in FIG. 7 is executed. The control unit 10 judges whether or not the time measured by the discarding restriction timer has reached a preset predetermined discarding restriction time (S201). When a judgment is made that the measured time has reached the discarding restriction time (S201: YES), the control unit 10 sets the discarding restriction flag to "0" (S202), and terminates the discarding restriction time measuring process. By setting the discarding restriction flag to "0" in step S202, the restriction on the discarding of sound data is released.

On the other hand, in step S201, when a judgment is made that the time measured by the discarding restriction timer has not reached the discarding restriction time (S201: NO), the control unit 10 returns the process to step S201 after waiting for a predetermined time, and repeats the subsequent processing again.

In the above-described accumulation process and discarding restriction time measuring process, when starting reception of sound data transmitted from a data output apparatus 1 having the transmission right, the data output apparatus 1 of the present invention restricts the discarding of sound data based on the upper accumulation limit amount, and releases the restriction on the discarding of sound data after elapse of the predetermined discarding restriction time. As the condition for releasing the restriction on the discarding of sound data, it may be possible to set suitable conditions according to a need as well as the elapse of the discarding restriction time.

For example, when the constant delay is detected, more specifically after discarding of sound data based on the constant delay is performed in step S112 of the accumulation process, the restriction on the discarding sound data may be released by resetting the discarding restriction flag to "0". It may also be possible to release the restriction on the discarding of sound data by resetting the discarding restriction flag to "0" when the accumulated amount becomes equal to or less than the upper accumulation limit amount due to the output of the accumulated sound data after the accumulated amount exceeded the upper accumulation limit amount once, based on the results of monitoring the accumulated amount of sound data accumulated in the accumulating unit 16.

Figure 8:
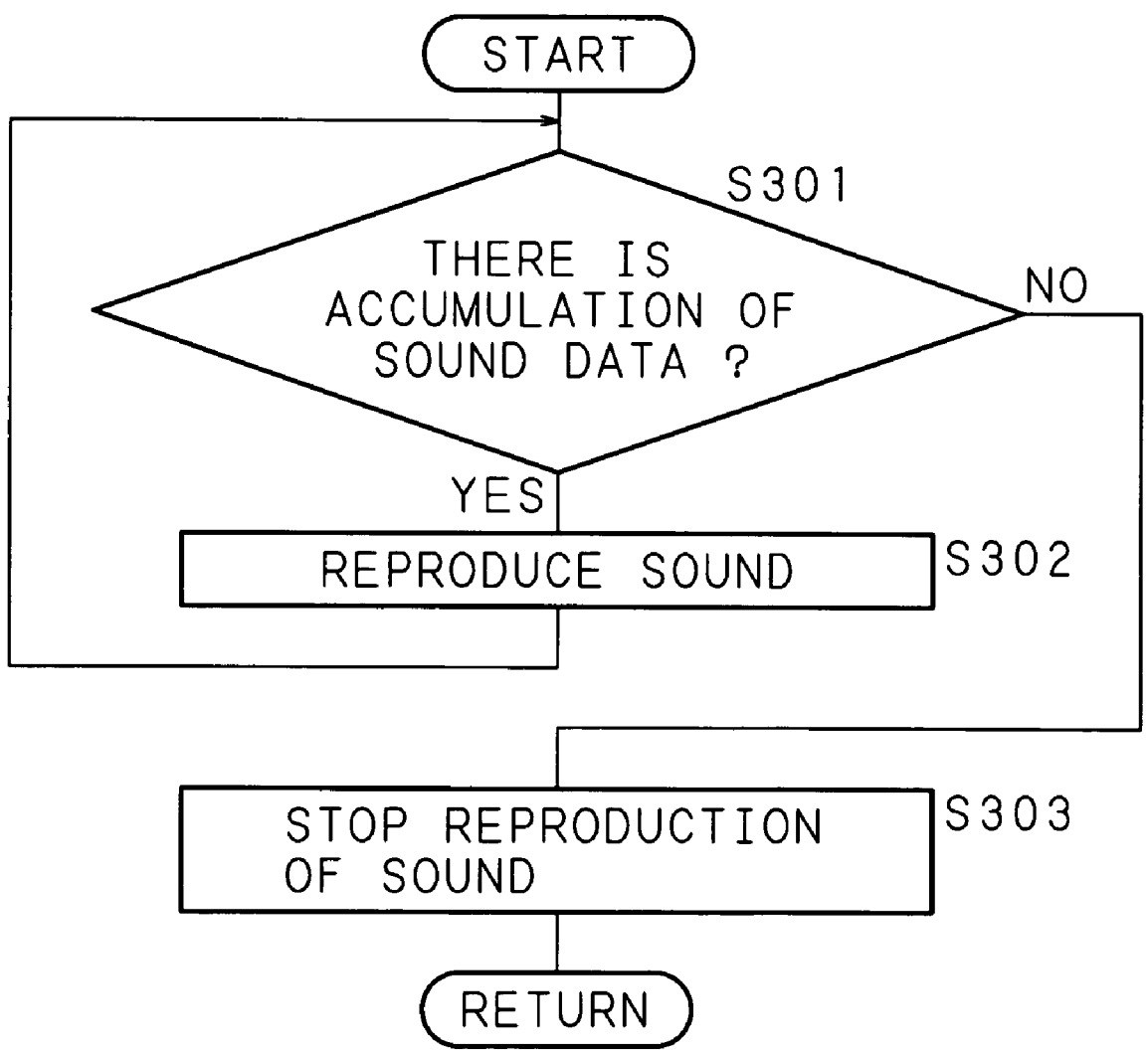
FIG. 8 is a flowchart showing the procedure of an output process performed by the data output apparatus of Embodiment 1 of the present invention.

FIG. 8 is a flowchart showing the procedure of an output process performed by the data output apparatus 1 of Embodiment 1 of the present invention. According to a computer program stored in the memory unit 11, the control unit 10 executes the process.

After starting reception of sound data transmitted from other data output apparatus 1 having the transmission right, or after stopping the reproduction of sound based on sound data, when the accumulated amount of sound data accumulated in the accumulating unit 16 reaches the initial accumulation amount, the control unit 10 of the data output apparatus 1 starts the output process. At a predetermined time interval set as an output interval, the control unit 10 of the data output apparatus 1 judges whether or not there is an accumulation of sound data that has not yet been outputted in the accumulating unit 16 (S301). When a judgment is made that there is an accumulation of sound data that has not yet been outputted in the accumulating unit 16 (S301: YES), the control unit 10 outputs the sound data accumulated in the accumulating unit 16 to the sound output unit 13 in the order in which the sound data was accumulated, and causes the sound output unit 13 to reproduce (output) sound based on the sound data (S302). Then, the control unit 10 returns the process to step S301 and repeats the above-described processing.

In step S301, when a judgment is made that there is no accumulation of sound data that has not yet been outputted in the accumulating unit 16 (S301: NO), the control unit 10 stops the reproduction (output) of sound based on sound data (S303), and terminates the output process. Note that when the accumulated amount of sound data accumulated in the accumulating unit reaches the initial accumulation amount again after stopping the reproduction of sound, the control unit 10 resumes the process from step S301.

Next, the following description will explain an example of the output state of data from the data output apparatus 1 of Embodiment 1 of the present invention. FIG. 9A and FIG. 9B are graphs showing a change with time in the accumulated amount of sound data in the accumulating unit 16 of the data output apparatus 1 of Embodiment 1 of the present invention.

FIG. 9A illustrates an example in which the restriction on discarding of sound data according to Embodiment 1 of the present invention is applied, and FIG. 9B illustrates an example in which the restriction on discarding of sound data of the present invention is not applied. In FIG. 9A and FIG. 9B, the axis of abscissas indicates time and the axis of ordinates indicates the accumulated amount of data to show their relationship. Moreover, S11 shown in the axis of ordinates represents the upper accumulation limit amount. Note that FIG. 9A and FIG. 9B show the state in which the transmission right is transferred to the second data output apparatus 1 after the first data output apparatus 1 transmitted sound data, and the change with time in the accumulated amount shown in FIG. 9A and FIG. 9B indicates a change with time in the accumulated amount of sound data in the accumulating unit 16 of a data output apparatus 1 at the receiving end that is different from both of the first and second data output apparatuses.

At time point T11 shown in FIG. 9A, the first data output apparatus 1 that has the transmission right so far releases the transmission right, and the data output apparatus 1 at the receiving end sets the discarding restriction flag to "1". Then, at time point T12, the second data output apparatus 1 acquires the transmission right, and the data output apparatus 1 at the receiving end starts measuring time with the discarding restriction timer. The transmission of sound data by the second data output apparatus 1 is started from time point T12, and burst reception of sound data occurs and the accumulated amount of data in the data output apparatus 1 at the receiving end increases abruptly. Then, after the accumulated amount of sound data in the accumulating unit 16 of the data output apparatus 1 at the receiving end reaches the upper accumulation limit amount at time point T13, the state in which the accumulated amount of sound data exceeds the upper accumulation limit amount continues. However, since the discarding of sound data is restricted, the discarding of sound data based on the upper accumulation limit amount is not performed. Then, when the discarding restriction time has elapsed at time point T14, the restriction on the discarding of sound data is released, and therefore the accumulated amount of sound data in the accumulating unit 16 of the data output apparatus 1 at the receiving end reaches the upper accumulation limit amount at time point T15. At time point T15, since the restriction on the discarding of sound data has already be released, the discarding of sound data based on the upper accumulation limit amount is performed, and the sound data exceeding the upper accumulation limit amount is not accumulated.

In FIG. 9B showing the state in which burst reception of sound data occurred similarly to FIG. 9A when the sound data discarding restriction was not applied, the state is similar to that shown in FIG. 9A until time point T12. However, in the example shown in FIG. 9B, since the discarding of sound data is not restricted at time point T13, the discarding of sound data based on the upper accumulation limit amount is performed.

It is clear from the comparison between FIG. 9A and FIG. 9B that since the data output apparatus 1 of the present invention is configured so that even when burst reception of sound data occurs after a transfer of the transmission right, the received sound data is not discarded, and therefore it is possible to prevent deterioration of sound quality before the optimization of reference amounts such as the upper accumulation limit amount and the initial accumulation amount.

Note that various conditions shown in Embodiment 1 are merely one example, and they can be set suitably according to the system configuration, purposes, etc. For example, although Embodiment 1 described above illustrates a mode in which the accumulation state is checked based on the number of received packets, the present invention is not limited to this, and may perform a check based on time.

Moreover, although Embodiment 1 described above illustrates a mode in which the discarding of sound data is prohibited as a restriction on the discarding of sound data, the present invention is not limited to this, and may be developed in various modes such as a mode in which the received sound data is thinned out as a restriction on the discarding of sound data, and, for example, the received packets may be discarded every other packet instead of discarding all the received packets.

Embodiment 2

According to Embodiment 1, Embodiment 2 of the present invention adopts a configuration capable of preventing a delay of sound output immediately after a transfer of the transmission right. Since the configuration of a communication system and the configurations of the apparatuses constituting the communication system of Embodiment 2 of the present invention are the same as those of Embodiment 1, the explanation thereof will be omitted. In the accumulation managing unit 17 of a data output apparatus 1 of Embodiment 2, dummy data is stored in advance. The dummy data is data for use as substitute data for sound data, and is soundless data that does not generate sound, or sound data for outputting a predetermined sound indicating that the data output apparatus 1 is on standby.

Figure 10:
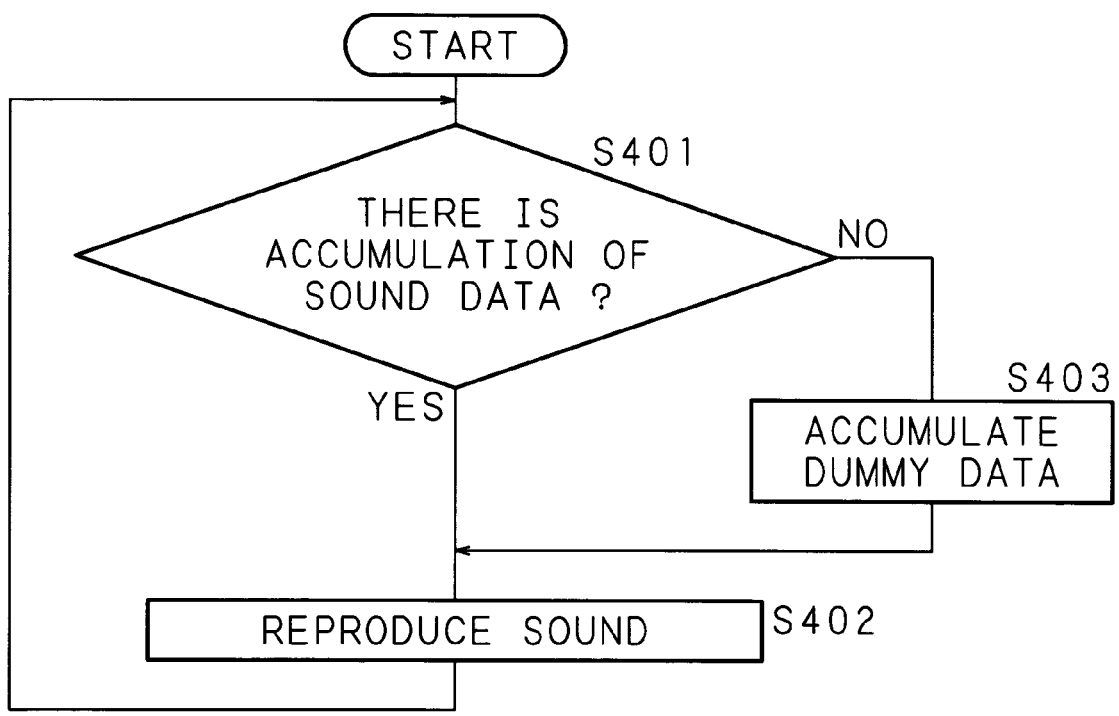
FIG. 10 is a flowchart showing a part of an output process performed by a data output apparatus of Embodiment 2 of the present invention.

The following description will explain the processes performed by the data output apparatus 1 of Embodiment 2 of the present invention. However, since the accumulation process and the discarding restriction time measuring process performed by the data output apparatus 1 of Embodiment 2 are the same as those of Embodiment 1, the explanation is omitted. FIG. 10 is a flowchart showing an output process performed by the data output apparatus 1 of Embodiment 2 of the present invention. According to a computer program stored in the memory unit 11, the control unit 10 executes the process.

In Embodiment 2, when starting reception of sound data sent from other data output apparatus 1 that has newly acquired the transmission right, the control unit 10 of the data output apparatus 1 judges whether or not there is an accumulation of sound data that has not been outputted in the accumulating unit 16 (S401). When a judgment is made that there is an accumulation of sound data that has not yet been outputted in the accumulating unit 16 (S401: YES), the control unit 10 causes the sound output unit 13 to reproduce (output) sound based on the sound data by outputting the accumulated sound data to the sound output unit 13 in the order in which the sound data was accumulated (S402). Subsequently, the control unit 10 returns the process to step S401, and repeats the same processing.

On the other hand, in step S401, when a judgment is made that there is no accumulation of sound data that has not been outputted in the accumulating unit 16 (S401: NO), the control unit 10 accumulates the dummy data previously stored in the accumulation managing unit 17 in the accumulating unit 16 (S403). Consequently, since the dummy data accumulated in the accumulating unit 16 is outputted to the sound output unit 13 in step S403, the sound based on the dummy data is outputted (reproduced) from the sound output unit 13 (S402). Note that in a case where the dummy data is soundless data, the output in step S402 is in soundless for a predetermined time based on the dummy data.

By the way, there may be a case where the sound data or dummy data outputted to the sound output unit 13 from the accumulating unit 16 is not immediately reproduced (outputted), but is accumulated temporarily in the buffer memory 131 and then reproduced (outputted) as a sound or soundless output after the accumulated amount of sound data in the buffer memory 131 reaches an initial accumulation amount set for the buffer memory 131. Therefore, in order to prevent a delay at the start of output, it is necessary to control the accumulated amount in the buffer memory 131. The above example of the process explained as Embodiment 2 illustrates a mode in which the accumulated amount in the buffer memory 131 is controlled by controlling the accumulated amount in the accumulating unit 16 based on the assumption that when there is no accumulation of sound data that has not yet been outputted in the accumulating unit 16, no sound data is accumulated in the buffer memory 131, while when there is an accumulation of sound data that has not yet been outputted in the accumulating unit 16, sound data is also accumulated in the buffer memory 131. Thus, Embodiment 2 of the present invention can also be developed in a mode in which the dummy data is accumulated in the buffer memory 131.

Figure 11:
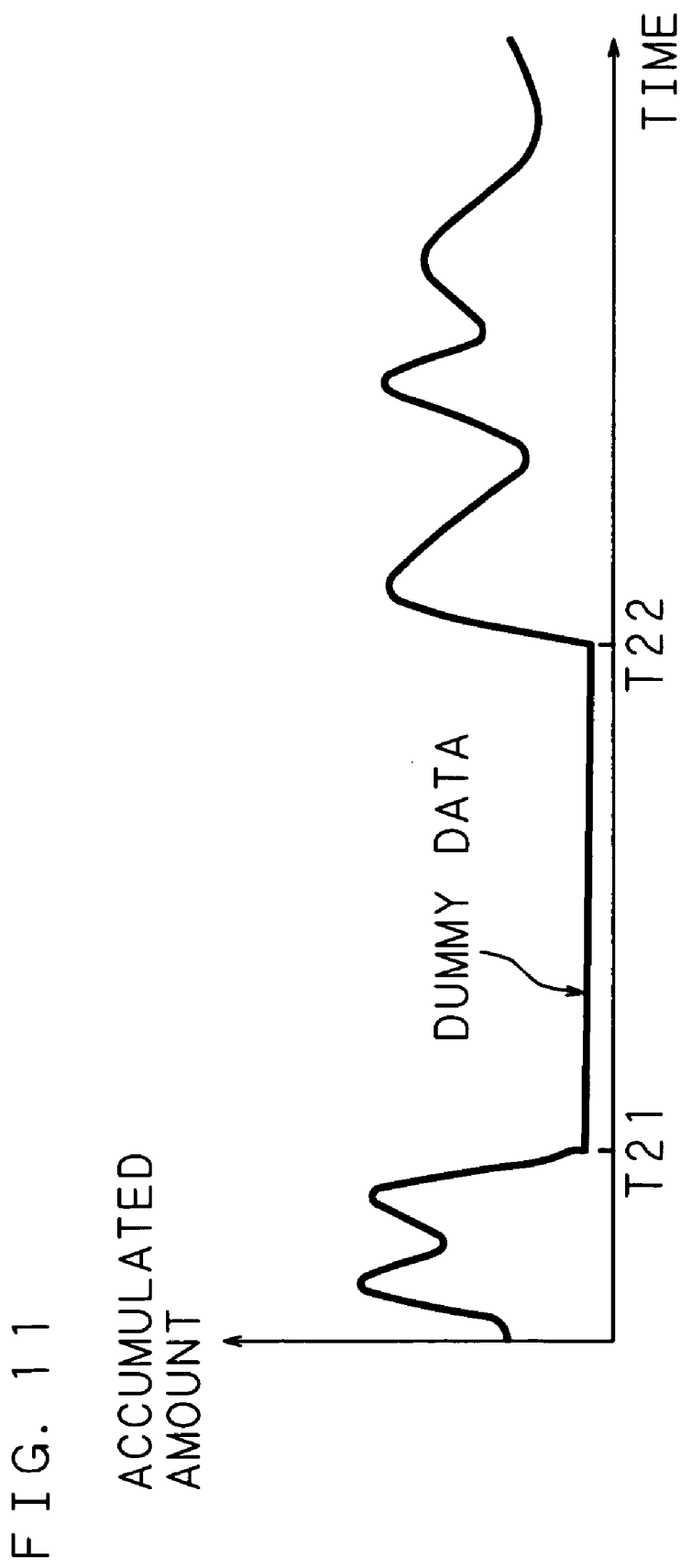
FIG. 11 is a graph showing an example of a change with time in the accumulated amount of sound data in the accumulating unit of the data output apparatus of Embodiment 2 of the present invention.

Next, the following description will explain an example of a change with time in the accumulated amount of sound data in the accumulating unit 16 of the data output apparatus 1 of Embodiment 2 of the present invention. FIG. 11 is a graph showing a change with time in the accumulated amount of sound data in the accumulating unit 16 of the data output apparatus 1 of Embodiment 1 of the present invention. In FIG. 11, the axis of abscissas indicates time and the axis of ordinates indicates the accumulated amount of data to show their relationship. FIG. 11 shows a change with time in the accumulated amount of sound data in the accumulating unit 16 of the data output apparatus 1 at the receiving end that is different from both of the first data output apparatus 1 and the second data output apparatus 1 when the transmission right was transferred to the second data output apparatus 1 after the first data output apparatus 1 transmitted the sound data.

At time point T21 shown in FIG. 11, the first data output apparatus 1 that has the transmission right so far releases the transmission right. Accordingly, the data output apparatus 1 at the receiving end outputs all the accumulated sound data, comes into a state in which there is no accumulation of sound data that has not yet been outputted in the accumulating unit 16. However, in the data output apparatus 1 at the receiving end, since the dummy data is accumulated in the accumulating unit 16, the data output apparatus 1 is not in a state in which the data accumulating unit 16 has no data to be outputted. Moreover, since the dummy data accumulated in the accumulating unit 16 of the data output apparatus 1 at the receiving end is outputted to the sound output unit 13 and accumulated in the buffer memory 131, the buffer memory 131 in the data output unit 13 will never be empty.

Then, at time point T22, when the second data output apparatus 1 acquires the transmission right and starts to transmit sound data, the data output apparatus 1 at the receiving end receives the sound data transmitted from the second data output apparatus 1 and starts to accumulate the sound data in the accumulating unit 16. Since the accumulating unit 16 will never be empty as mentioned above, the output of sound data to the sound output unit 13 is started immediately without waiting for the accumulated amount of sound data to reach the initial accumulation amount. Moreover, in the sound output unit 13, although the received sound data is accumulated in the buffer memory 131, the reproduction of sound based on the sound data is started immediately without waiting for the accumulated amount of sound data to reach the initial accumulation amount set for the buffer memory 131. Thus, since the dummy data has already be accumulated in the accumulating unit 16 at the stage of accumulating the sound data transmitted from the second data output apparatus 1 in the accumulating unit 16, the time until the sound data starts to be outputted to the sound output unit 13 after the accumulated amount reaches the initial accumulation becomes 0. In addition, since the dummy data is also accumulated in the buffer memory 131, the time until the start of reproduction of sound also becomes 0. Therefore, according to the data output apparatus 1 of Embodiment 2 of the present invention, it is possible to prevent the occurrence of delay when starting the output.

Note that the various conditions shown in Embodiment 2 are merely one example, and they can be set suitably according to the system configuration, purposes, etc.

Embodiment 3

According to Embodiment 1, Embodiment 3 of the present invention adopts a configuration capable of preventing deterioration of communication quality particularly in a situation where the transmission right is transferred frequently due to a large number of the data output apparatuses in a group. Since the configurations of a communication system and various apparatuses according to Embodiment 3 of the present invention are the same as those of Embodiment 1, the explanation thereof will be omitted. However, the accumulation managing unit 17 of a data output apparatus 1 of Embodiment 3 is configured to store the reference amounts of the upper accumulation limit amount, initial accumulation amount, etc. in association with identification information such as telephone numbers for identifying other data output apparatuses 1, 1, . . . .

Figure 12:
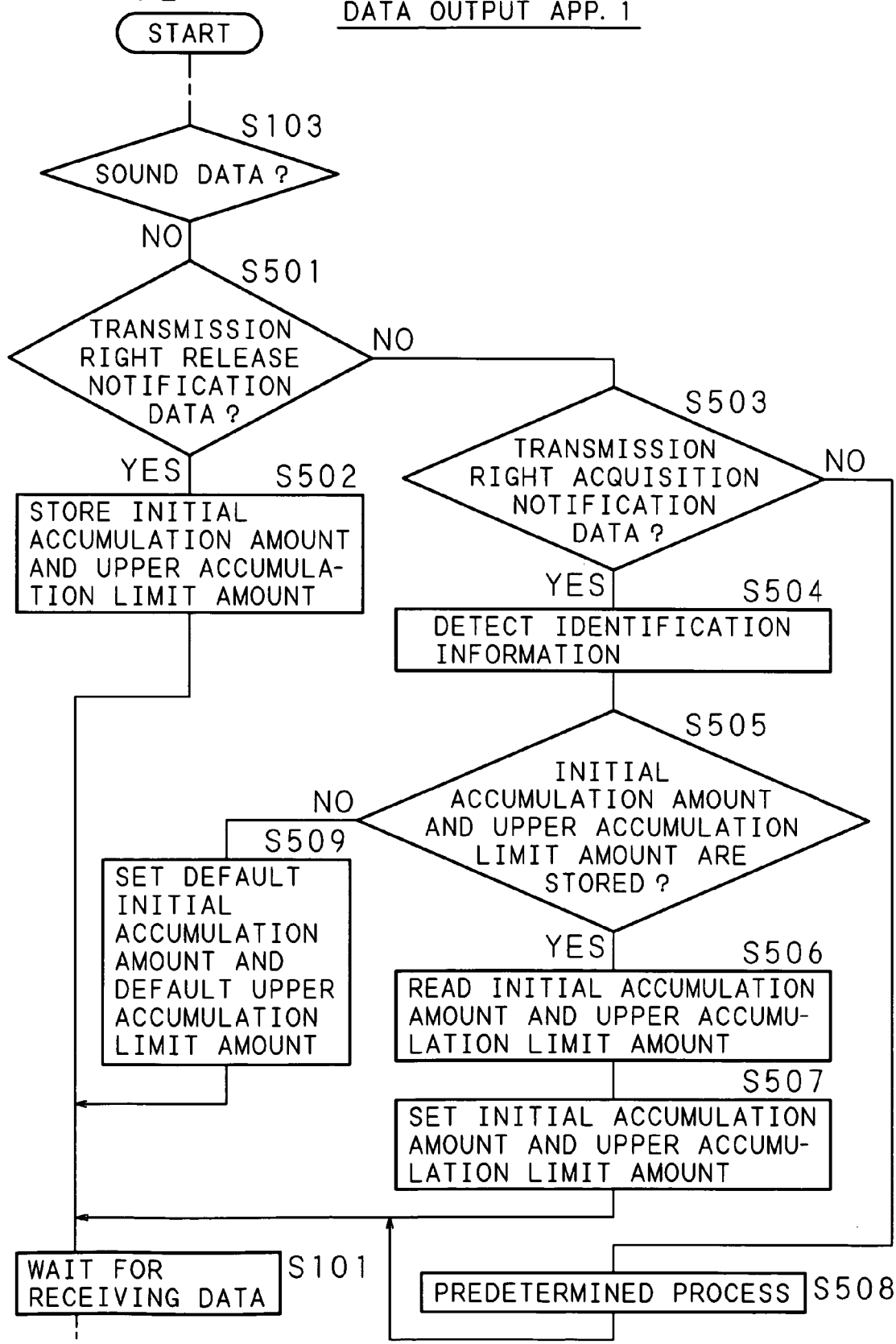
FIG. 12 is a flowchart showing a part of an accumulation process performed by a data output apparatus of Embodiment 3 of the present invention.

The following description will explain the processes performed by the data output apparatus 1 of Embodiment 3 of the present invention. FIG. 12 is a flowchart showing a part of an accumulation process performed by the data output apparatus 1 of Embodiment 3 of the present invention. According to a computer program stored in the memory unit 11, the control unit 10 executes the process.

In Embodiment 3, since the processing from the state of waiting to receive data in the accumulation process, judging that the received data is sound data in step S103 of Embodiment 1 described above, accumulating the sound data in the accumulating unit 16, or discarding the sound data, to the step of optimizing the initial accumulation amount and the upper accumulation limit amount is the same as the processing of steps S101 to S113 of Embodiment 1 shown in FIG. 6A, FIG. 6B and FIG. 6C, the explanation is omitted.

In step S103, when a judgment is made that the received data is not sound data (S103: NO), the control unit 10 of the data output apparatus 1 judges whether or not the received data is transmission right release notification data sent from the relay apparatus 2 to notify the release of the transmission right (S501).

In step S501, when a judgment is made that the received data is the transmission right release notification (S501: YES), the control unit 10 stores the initial accumulation amount and upper accumulation limit amount set at this time and the identification information for identifying other data output apparatus 1 that has released the transmission right in association with each other in the accumulation managing unit 17 (S502). Thereafter, the control unit 10 returns the process to step S101 explained in Embodiment 1, and repeats the subsequent processing to receive the next packet. Note that in Embodiment 3, the process of setting the discard restriction flag to "1" that is executed as step S115 in Embodiment 1 is omitted. However, needless to say, in order to obtain the same effects as Embodiment 1, the process of step S115 is also executed in Embodiment 3 after storing the initial accumulation amount and the upper accumulation limit amount.

In step S501, when a judgment is made that the received data is not the transmission right release notification (S501: NO), the control unit 10 judges whether or not the received data is transmission right acquisition notification data sent from the relay apparatus 1 to notify the acquisition of the transmission right (S503).

In step S503, when a judgment is made that the received data is the transmission right acquisition notification data (S503: YES), the control unit 10 detects the identification information of other data output apparatus 1 that has newly acquired the transmission right (S504), and judges whether or not the initial accumulation amount and the upper accumulation limit amount corresponding to the detected identification information are stored in the accumulation managing unit 17 (S505).

In step S505, when a judgment is made that the initial accumulation amount and the upper accumulation limit amount corresponding to the detected identification information are stored in the accumulation managing unit 17 (S505: YES), the control unit 10 reads the initial accumulation amount and the upper accumulation limit amount stored in the accumulation managing unit 17 in association with the detected identification information (S506), and sets the initial accumulation amount and the upper accumulation limit amount based on the read initial accumulation amount and upper accumulation limit amount (S507). Thereafter, the control unit 10 returns the process to step S101 of Embodiment 1, and repeats the subsequent processing to receive the next packet. Note that in Embodiment 3, the process of starting to measure time with the discarding restriction timer that is executed as step S117 in Embodiment 1 is omitted. However, needless to say, in order to obtain the same effects as Embodiment 1, the process of step S117 is also executed in Embodiment 3 after making the settings based on the read initial accumulation amount and upper accumulation limit amount.

In step S503, when a judgment is made that the received data is not the transmission right acquisition notification data (S503: NO), the control unit 10 executes a predetermined process according to the received data (S508), returns the process to step S101 of Embodiment 1 and repeats the subsequent processing to receive the next data.

On the other hand, in step S505, when a judgment is made that the initial accumulation amount and the upper accumulation limit amount corresponding to the detected identification information are not stored in the accumulation managing unit 17 (S505: NO), the control unit 10 sets the default initial accumulation amount and the default upper accumulation limit amount prepared as the initial set values (S509). Then, the control unit 10 returns the process to step S101 of Embodiment 1, and repeats the subsequent processing to receive the next packet.

Note that since the discarding restriction time measuring process and output process performed by the data output apparatus 1 of Embodiment 3 of the present invention are the same as those of Embodiment 1, the explanation is omitted.

Figure 13:
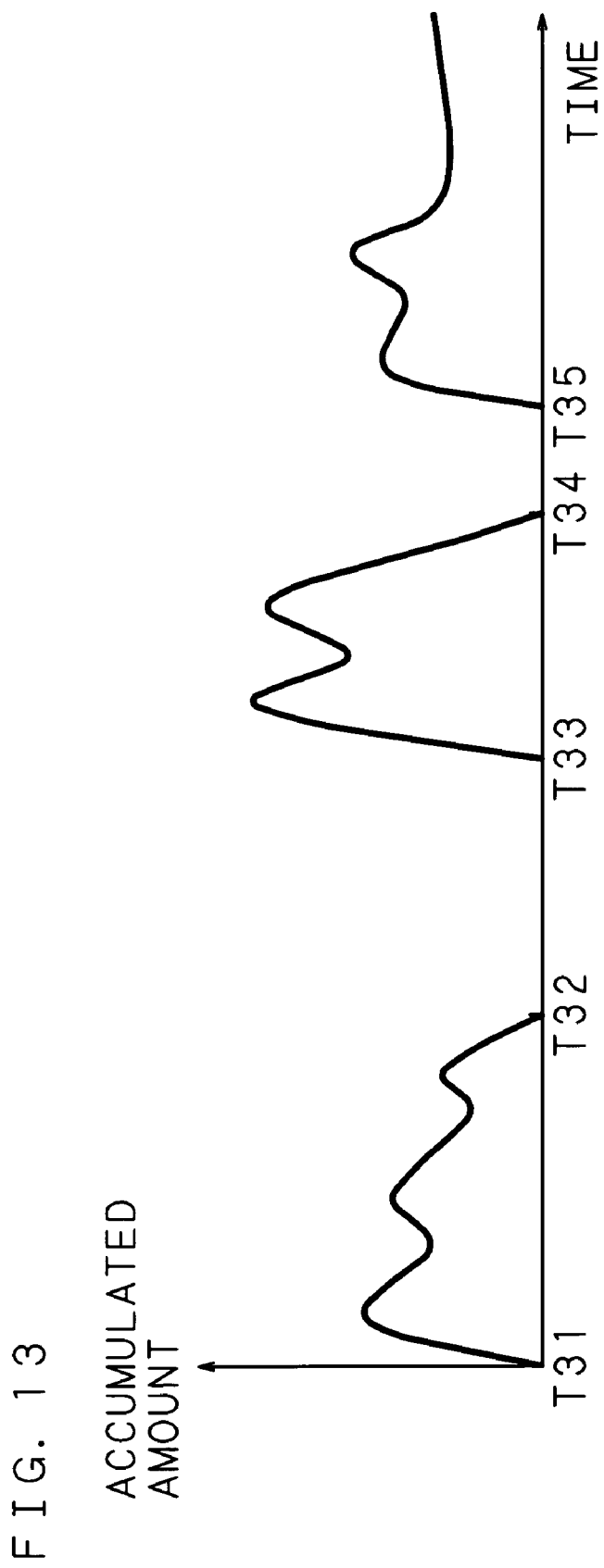
FIG. 13 is a graph showing an example of a change with time in the accumulated amount of sound data in the accumulating unit of the data output apparatus of Embodiment 3 of the present invention.

Next, the following description will explain an example of a change with time in the accumulated amount of sound data in the accumulating unit 16 of the data output apparatus 1 of Embodiment 3 of the present invention. FIG. 13 is a graph showing a change with time in the accumulated amount of sound data in the accumulating unit 16 of the data output apparatus 1 of Embodiment 3 of the present invention. In FIG. 13, the axis of abscissas indicates time and the axis of ordinates indicates the accumulated amount to show their relationship. FIG. 13 shows a change with time in the accumulated amount of sound data in the accumulating unit 16 of the data output apparatus 1 at the receiving end that is different from both of the first data output apparatus 1 and the second data output apparatus 1 when the transmission right was transferred to the second data output apparatus 1 after the sound data was transmitted by the first data output apparatus 1 and then the transmission right was transferred again to the first data output apparatus 1.

Between time point T31 and time point T32, the data output apparatus 1 at the receiving end accumulates the sound data transmitted from the first data output apparatus 1 in the accumulating unit 16. During the accumulation of the sound data, the initial accumulation amount and the upper accumulation limit amount are optimized in the data output apparatus 1 at the receiving end. Then, when the transmission right is released at time point T32, in the data output apparatus 1 at the receiving end, the initial accumulation amount and the upper accumulation amount at this time point are stored in association with the identification information of the first data output apparatus 1. Then, at time point T33, the data output apparatus 1 at the receiving end starts to accumulate the sound data transmitted from the second data output apparatus 1. In this case, since the read values of the stored initial accumulation amount and upper accumulation limit amount are set as the initial accumulation amount and upper accumulation limit amount for the second data output apparatus 1, discarding of sound data and constant delay do not occur even when the optimization is not performed. Then, at time point T34, the transmission right is released, and the initial accumulation amount and upper accumulation limit amount at this time point are stored in association with the identification information of the second data output apparatus 1. Then, at time point T35, the data output apparatus 1 at the receiving end starts to accumulate the sound data transmitted from the first data output apparatus 1. In this case, for the initial accumulation amount and upper accumulation limit amount, the initial accumulation amount and upper accumulation limit amount stored previously in association with the identification information of the first data output apparatus 1 at time point T32 are read and set.

Thus, in Embodiment 3 of the present invention, when resuming the reception of data from a data output apparatus 1 communicated in the past, the initial accumulation amount and upper accumulation limit amount stored during the past communication with the data output apparatus 1 are set. Therefore, when resuming the reception of data from the data output apparatus 1 communicated in the past, since the optimized initial accumulation amount and upper accumulation limit amount are used as the initial values, the accumulated amount of sound data is managed by appropriate initial accumulation amount and upper accumulation limit amount even before optimizing the initial accumulation amount and upper accumulation limit amount after resuming the reception, and thus it is possible to prevent deterioration of voice.

Note that various conditions shown in Embodiment 3 are merely one example, and they can be set suitably according to the system configuration, purposes, etc. For example, although Embodiment 3 described above illustrates a mode in which the initial accumulation amount and the upper accumulation limit amount are stored as reference amounts, the present invention is not limited to this, and may be performed in a mode in which reference amounts other than the initial accumulation amount and upper accumulation limit amount may be stored.

Moreover, although Embodiment 3 described above illustrates a mode in which the read initial accumulation amount and upper accumulation limit amount are stored as it is as the set values, the present invention is not limited to this, and may be developed in various modes such as a mode in which the upper accumulation limit amount is set by adding a predetermined value to the read upper accumulation limit amount.

Although Embodiment 1 through Embodiment 3 described above illustrates a mode in which an IP telephony terminal apparatus having a transceiver function is used as a data output apparatus, the present invention is not limited to this, and a PoC server computer for use as a relay apparatus may be used as a data output apparatus. A data output apparatus according to Embodiment 1 through Embodiment 3 reproduces sound based on sound data included in a packet as an output based on the received sound data. However, when a PoC server computer for use as a relay apparatus is used as a data output apparatus, a packet including sound data received from one apparatus is transmitted to another apparatus as an output based on the received sound data.

Further, although Embodiment 1 through Embodiment 3 described above illustrate a mode in which sound data is accumulated and then outputted, the present invention is not limited to this, and is applicable to various types of streaming data such as image data as well as sound data.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A voice data output method for accumulating received voice data in a data accumulating unit to which an upper accumulation limit amount as a basis for discarding accumulated voice data is set, and performing output based on the voice data accumulated in the data accumulating unit, the voice data output method comprising:
   releasing the upper accumulation limit amount during predetermined period of time from a time point at which reception of the voice data starts;
   receiving the voice data during the predetermined period of time and accumulating the received voice data in the data accumulating unit;
   discarding the voice data that has been accumulated in the data accumulating unit and that exceeds a set value of the upper accumulation limit amount, the discarding being performed only after the predetermined period of time elapses; and
   outputting the voice data accumulated in the data accumulating unit to a jitter buffer, wherein
   voice output processing is performed on the basis of the voice data outputted to and stored on the jitter buffer.

2. The data output method as set forth in claim 1, wherein
   an initial accumulation amount as a basis for starting to output the accumulated data is further set to said data accumulating unit, and
   dummy data is stored in an amount not exceeding said initial accumulation amount in advance in the data accumulating unit prior to starting reception of data.

3. The data output method as set forth in claim 2, wherein
   a transmitting source apparatus of data is identified when starting reception of data,
   set values of said upper accumulation limit amount and said initial accumulation amount stored in association with the identified transmitting source apparatus are read, and
   the upper accumulation limit amount and the initial accumulation amount are set based on the read set values.

4. A data output apparatus having a data accumulating unit, to which an upper accumulation limit amount as a basis for discarding accumulated voice data is set, for accumulating received data in said data accumulating unit and performing output based on the voice data accumulated in the data accumulating unit, the apparatus comprising
   a releasing unit that releases the upper accumulation limit amount during predetermined period of time from a time point at which reception of the voice data starts;
   a receiving unit that receives the voice data during the predetermined period of time and accumulating the received voice data in the data accumulating unit;
   a discarding unit that discards the voice data that has been accumulated in the data accumulating unit that exceeds a set value of the upper accumulation limit amount, the discarding being performed only after the predetermined period of time elapses; and an outputting unit that outputs the voice data accumulated in the data accumulating unit to a jitter buffer, wherein voice output processing is performed on the basis of the voice data outputted to and stored on the jitter buffer.

5. The data output apparatus as set forth in claim 4, further comprising a communicating unit that communicates with each apparatus in a group consisting of a plurality of apparatuses, wherein one apparatus that has acquired a transmission right transmits voice data to the other apparatuses in a broadcast manner.

6. The data output apparatus as set forth in claim 5, wherein an output based on the voice data is a sound output reproduced based on the voice data.

7. The data output apparatus as set forth in claim 4, wherein an initial accumulation amount as a basis for starting to output the accumulated data is further set to said data accumulating unit, and said data output apparatus further comprises:
a dummy data storing unit that stores in advance dummy data to be accumulated in said data accumulating unit; and
a dummy data accumulating unit that accumulates the dummy data stored in said dummy data storing unit in an amount not exceeding said initial accumulation amount in advance in said data accumulating unit prior to starting reception of data.

8. The data output apparatus as set forth in claim 7, further comprising a communicating unit that communicates with each apparatus in a group consisting of a plurality of apparatuses, wherein one apparatus that has acquired a transmission right transmits voice data to the other apparatuses in a broadcast manner.

9. The data output apparatus as set forth in claim 8, wherein an output based on the voice data is a sound output reproduced based on the voice data, and
the dummy data is soundless data, or data for reproducing and outputting a predetermined sound.

10. The data output apparatus as set forth in claim 7, further comprising a judging unit that judges whether or not there is an accumulation of voice data to be outputted in said data accumulating unit,
wherein when a judgment is made by said judging unit that there is no accumulation of data to be outputted in said data accumulating unit, said dummy data accumulating unit accumulates the dummy data stored in said dummy data storing unit in said data accumulating unit.

11. The data output apparatus as set forth in claim 7, further comprising:
a set-values storing unit that stores set values of said upper accumulation limit amount and said initial accumulation amount in association with identification information for identifying a transmitting source apparatus during reception of the voice data;
a transmitting source apparatus identifying unit that identifies a transmitting source apparatus of data when starting reception of the data;
a set-values reading unit that reads the set values stored in said set-values storing unit in association with the identification information identifying an apparatus identified by said transmitting source apparatus identifying unit; and
a setting unit that sets said upper accumulation limit amount and said initial accumulation amount based on the set values read from said storing unit by said set-values reading unit.

12. A communication system including: a plurality of data output apparatuses each having a data accumulating unit, to which an upper accumulation limit amount as a basis for discarding accumulated voice data is set, for accumulating received voice data in the data accumulating unit and performing output based on the voice data accumulated in the data accumulating unit, and comprising: a releasing unit that releases the upper accumulation limit amount during predetermined period of time from a time point at which reception of the voice data starts; a receiving unit that receives the voice data during the predetermined period of time and accumulating the received voice data in the data accumulating unit; a discarding unit that discards the voice data that has been accumulated in the data accumulating unit and that exceeds a set value of the upper accumulation limit amount, the discarding being performed only after the predetermined period of time elapses; and an outputting unit that outputs the voice data accumulated in the data accumulating unit to a jitter buffer, wherein voice output processing is performed on the basis of the voice data outputted to and stored on the jitter buffer,
one apparatus having a transmission right among said plurality of data output apparatuses has a transmission right to transmit voice data to the other data output apparatuses in a broadcast manner, and
when said data output apparatus having the transmission right releases the transmission right, the other data output apparatuses start receiving voice data.

* * * * *